(12) United States Patent
Fujimori

(10) Patent No.: US 7,492,481 B2
(45) Date of Patent: Feb. 17, 2009

(54) IMAGE OUTPUT DEVICE

(75) Inventor: Yukimitsu Fujimori, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 769 days.

(21) Appl. No.: 10/971,574

(22) Filed: Oct. 22, 2004

(65) Prior Publication Data

US 2005/0190409 A1 Sep. 1, 2005

(30) Foreign Application Priority Data

Oct. 23, 2003 (JP) ............................. 2003-363430

(51) Int. Cl.
*H04N 1/405* (2006.01)
(52) U.S. Cl. ..................................... 358/3.12; 358/3.09
(58) Field of Classification Search ....... 358/3.06–3.12, 358/1.9, 2.1, 1.15, 502
See application file for complete search history.

(56) References Cited

U.S. PATENT DOCUMENTS 6,834,936 B2 * 12/2004 Teshigawara et al. ......... 347/43
2002/0070999 A1 * 6/2002 Teshigawara et al. ......... 347/41

FOREIGN PATENT DOCUMENTS

JP 06-115099 4/1994
JP 06-334844 12/1994

OTHER PUBLICATIONS

Abstract of Japanese Patent Publication No. 06-115099 Pub. Date: Apr. 26, 1994, Patent Abstracts of Japan.

Abstract of Japanese Patent Publication No. 06-334844, Pub. Date: Dec. 2, 1994, Patent Abstracts of Japan.

* cited by examiner

*Primary Examiner*—Thomas D Lee
*Assistant Examiner*—Stephen M Brinich
(74) *Attorney, Agent, or Firm*—Martine Penilla & Gencarella, LLP

(57) ABSTRACT

The technique of the invention sequentially supplies dot data to multiple dot formation elements, which are actuated to create dots simultaneously on multiple pixel arrays arranged at preset intervals, and thereby completes a resulting output image on an output medium. The procedure temporarily stores received dot data in a memory, reads out only dot data of the multiple pixel arrays, on which dots are to be created simultaneously by the multiple dot formation elements, converts the read-out dot data into high-resolution dot data, and supplies the converted high-resolution dot data in an order of actual dot formation to the multiple dot formation elements. Dots are sequentially created according to the supplied high-resolution dot data to give a high-quality image. Only the dot data of the multiple pixel arrays, on which dots are to be created simultaneously by the multiple dot formation elements, are set to the current object of resolution enhancement. The converted high-resolution dot data accordingly do not occupy a large memory space. This arrangement desirably ensures output of a high-resolution image without significantly increasing the required storage capacity.

7 Claims, 21 Drawing Sheets

Fig.14A [MAPPING A] 
Fig.14B [MAPPING B] 
Fig.14C [MAPPING C] 
Fig.14D [MAPPING D] 
Fig.14E [MAPPING E] 
Fig.14F [MAPPING F] 

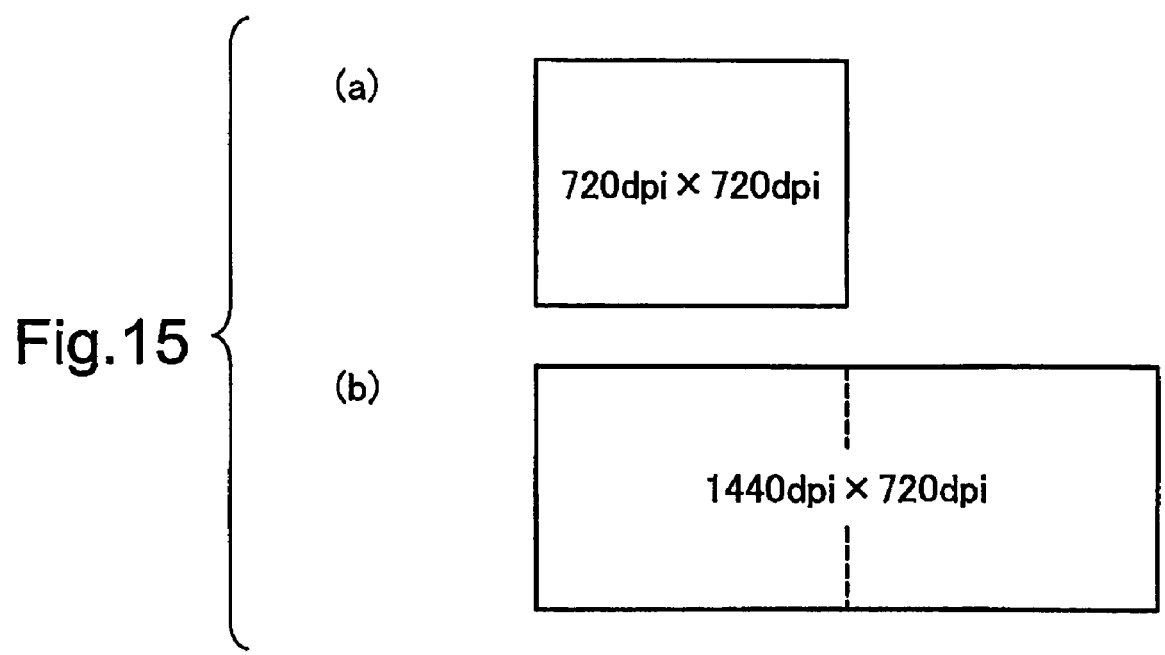

Fig.19A  [MAPPING G]
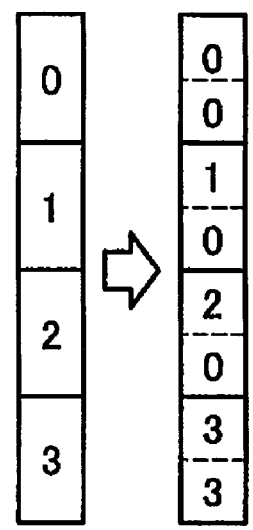
Fig.19B  [MAPPING H]
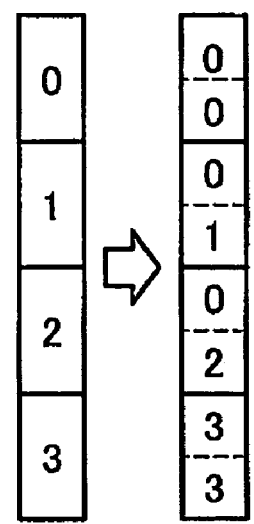
Fig.19C  [MAPPING I]
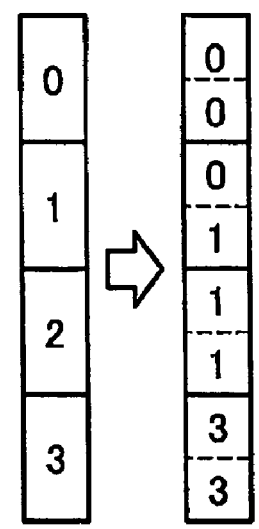

Fig.21

| A | B | A | B | A | B | A | B | A | B | A | B | A | B |
|---|---|---|---|---|---|---|---|---|---|---|---|---|---|
| B | A | B | A | B | A | B | A | B | A | B | A | B | A |
| A | A | A | B | A | B | A | B | A | B | A | B | A | A |
| B | A | B | A | A | B | A | B | A | B | A | A | A | B |
| A | B | A | B | B | A | B | A | B | A | B | | | |
| A | B | A | B | A | B | A | B | A | | | | | |
| B | A | B | A | B | A | A | | | | | | | |

IMAGE OUTPUT DEVICE

TECHNICAL FIELD

The present invention relates to a technique of creating dots on an output medium to complete a resulting output image. More specifically the invention pertains to a technique of outputting an image while converting image data into high-resolution data.

RELATED ART

Image output devices that create dots on an output medium, such as printing paper or a liquid crystal display screen, to output a resulting image have widely been used in various image-relating systems. Diversity of novel image output devices have been proposed to adopt the technologies of organic EL (electro luminescence) and electronic inks. In such image output devices, an image is regarded as a set of multiple pixels arranged in a lattice and is expressed by formation of dots in the respective pixels according to data representing the dot on-off state in the respective pixels (dot data). The dot data are generated from image data through an adequate series of image processing. Any of diverse known techniques including a systematic dither method, other various dither methods, and an error diffusion method, may be applied for such image processing. The image output device receives the generated dot data and creates dots in the respective pixels according to the received dot data. One image consists of a large number of pixels. The image output device does not simultaneously create all dots, but sequentially creates dots along pixel arrays. Sequential formation of dots along the pixel arrays gives a resulting output image on the output medium.

An effective technique preferably adopted in such image output devices divides an image into a greater number of small pixels and accordingly outputs a higher-resolution image. Division of an image into the smaller pixels (that is, the resolution enhancement of the image output) reduces the size of the dots created in the respective pixels. This technique makes the respective dots inconspicuous and accordingly heightens the picture quality of the resulting image. One example of such technique is an image output device disclosed in Japanese Patent Laid-Open Gazette No. 6-334844.

The higher-resolution image output, however, undesirably increases the required storage capacity of the image output device. The dot data are sequentially supplied from the head pixel array of the image to the image output device. The image output device creates dots along the pixel arrays according to the supplied dot data to complete an output image. Formation of dots along the pixel arrays may, however, not be carried out sequentially from the head pixel array of the image. Dot formation elements of the image output device, for example, nozzles of an inkjet printer, may be arranged at a larger pitch than the interval of the pixel arrays. The image output device may use multiple driver ICs for formation of pixel arrays and allocate a preset area of pixel arrays to each EC. Such an image output device may create dots along the pixel arrays in a different order from the sequence of the received dot data. The image output device of this arrangement temporarily stores the received dot data in an internal memory, reads out dot data of object pixels for dot formation, and actually creates dots along the pixel arrays to complete an output image. In the image output device that temporarily stores the received dot data in the internal memory, the required storage capacity undesirably increases with an increase in number of pixels due to the high-resolution image output.

Such an increase in number of pixels caused by the high-resolution image output also undesirably extends the required time for image processing and generation of dot data. This results in a difficulty in prompt image output.

SUMMERY

The object of the invention is thus to eliminate the drawbacks of the prior art and to provide a technique of outputting a high-quality image without causing any significant troubles, such as the increased storage capacity to be set in an image output device and the lowered image output speed.

In order to attain at least part of the above and the other related objects, the present invention is directed to an image output device that creates dots on an output medium to complete a resulting output image. The image output device includes: a dot data storage module that stores dot data representing a dot on-off state with regard to each of multiple pixels included in the image; multiple dot formation elements that are actuated to create dots simultaneously on multiple pixel arrays arranged at preset intervals; and a dot data supply module that reads dot data of the multiple pixel arrays, on which dots are to be created simultaneously by the multiple dot formation elements, out of the dot data storage module, converts the read-out dot data into high-resolution dot data, and supplies the high-resolution dot data in an order of actual dot formation to the multiple dot formation elements.

There is an image output method corresponding to the above image output device. The invention is thus directed to an image output method that actuates multiple dot formation elements to create dots simultaneously on multiple pixel arrays arranged at preset intervals and accordingly completes a resulting output image on an output medium. The image output method includes: a first step of storing dot data that represents a dot on-off state with regard to each of multiple pixels included in the image; a second step of reading dot data of the multiple pixel arrays, on which dots are to be created simultaneously by the multiple dot formation elements, out of the stored dot data and converting the read-out dot data into high-resolution dot data; and a third step of supplying the converted high-resolution dot data in an order of actual dot formation by the dot formation elements to the multiple dot formation elements, so as to create dots on the output medium.

The image output device and the corresponding image output method of the invention supply the dot data to the multiple dot formation elements, which create dots on the multiple pixel arrays arranged at the preset intervals to complete an output image. The technique of the invention reads out the dot data of the multiple pixel arrays, on which dots are to be created simultaneously by the multiple dot formation elements, converts the read-out dot data into high-resolution dot data, and supplies the converted high-resolution dot data in the order of actual dot formation to the multiple dot formation elements.

Dots are sequentially created according to the supplied high-resolution dot data to give a high-quality output image. Only the dot data of the multiple pixel arrays, on which dots are to be created simultaneously by the multiple dot formation elements, are set to the current object of resolution enhancement. This arrangement does not significantly increase the storage capacity required for the resolution enhancement of the dot data in the image output device.

The dot data are to be converted into the high-resolution dot data at the stage of data supply. Namely the dot data are generated at a lower resolution than the resolution of the image output. In general, the lower-resolution dot data are more promptly generable and suppliable to the image output device than the higher-resolution dot data. The image output device and the corresponding image output method of the invention thus advantageously ensure the higher-speed image output.

In one preferable embodiment of the image output apparatus of the invention, the multiple dot formation elements simultaneously create dots in a preset number of pixels selected among plural pixels included in each of the multiple pixel arrays, so as to complete each pixel array by multiple operations of dot formation.

In the case of completing each pixel array by multiple operations of dot formation, the order of dot formation on each pixel array by the dot formation element is generally different from the pixel sequence on the image. In this technique, the image output device is required to keep storage of the dot data until formation of all the dots on each pixel array. In the event of dot formation on each pixel array by multiple operations, the procedure converts the dot data of each pixel array as a target of dot formation by the dot formation element into high-resolution dot data and supplies the converted high-resolution dot data in the order of actual dot formation. This arrangement desirably saves the storage capacity required for storage of the dot data.

The image output device may enhance resolution of the read-out dot data in a direction of the pixel arrays to the high-resolution dot data and subsequently supply the high-resolution dot data to the multiple dot formation elements.

The resolution enhancement in this manner converts dot data of the multiple pixel arrays into the high-resolution dot data of the same multiple pixel arrays. This arrangement desirably simplifies the process of converting the dot data into the high-resolution dot data and supplying the high-resolution dot data to the dot formation elements.

The image output device may alternatively enhance resolution of the read-out dot data in a direction perpendicular to the pixel arrays to the high-resolution dot data and subsequently supply the high-resolution dot data to the multiple dot formation elements.

The target of the resolution enhancement is only the dot data of the multiple pixel arrays, on which dots are to be created simultaneously by the dot formation elements. This arrangement ensures high-resolution output of a high-quality image without significantly increasing the required storage capacity.

Among the high-resolution dot data, the dot data that are not immediately supplied to the dot formation elements may be kept storage for a subsequent data supply or may be discarded once and be regenerated from the low-resolution dot data as the occasion demands. Storage of the dot data that are not immediately supplied ensures prompt output of a high-quality image, while naturally increasing the required storage capacity. This, however, still effectively saves the storage capacity, compared with the resolution enhancement of the whole image data. Destruction of the dot data that are not immediately supplied, on the other hand, significantly saves the storage capacity, although requiring regeneration of the high-resolution dot data from the low-resolution dot data.

The image output device may be designed to create different types of dots having variable sizes and receive the dot data representing a selected type of dot to be created in each pixel, the dot data may be converted into the high-resolution dot data in the following manner. Dot data of each target pixel is to be converted into data of multiple divisional pixels corresponding to the high resolution. The applicable procedure stores in advance a mapping of each dot type to a distribution of dots to be created in the plural divisional pixels and converts the dot data into the high-resolution dot data according to the stored mapping.

The optimum setting of the mapping of the dot type to the distribution of dots to be created in the plural divisional pixels ensures adequate conversion of the dot data into the high-resolution dot data and thereby gives a high-quality output image.

With regard to each pixel with a largest-size dot to be created, the mapping may be set to create the largest-size dot in all the plural divisional pixels.

In the technique of creating different types of dots having variable sizes, a solid image is typically expressed by formation of the largest-size dots in all the pixels. Setting the specific mapping to create the large-size dots in all the plural divisional pixels desirably gives a high-resolution solid image where the largest-size dots are created in all the pixels.

In the technique of creating different types of dots having variable sizes, the image output device may store multiple mappings of each dot type to a distribution of dots to be created in the plural divisional pixels and selectively apply one of the stored multiple mappings to convert the dot data into the high-resolution dot data.

This technique does not constantly uses the identical mapping but selectively uses one of the multiple mappings for conversion of the dot data into the high-resolution dot data. The resolution enhancement of this technique effectively prevents dot formation in a fixed pattern and thus ensures output of a high-quality image of good dot dispersion.

Selection among the multiple mappings may be switched over at random, but it is preferable to select one of the multiple mappings according to a dither matrix. As is known in the art, the dither matrix sets threshold values distributed adequately to prevent dot formation in a periodic pattern. Selection of the mapping according to the dither matrix thus effectively prevents the use of a certain mapping in a periodic pattern and thereby dot formation in any periodic pattern.

The dither matrix is preferably set corresponding to the low resolution prior to the resolution enhancement. The use of this dither matrix having such settings ensures adequate selection of multiple mappings in the low resolution.

The technique of the invention may be attained by a computer that reads a program of actualizing the image output method described above and executes the respective functions. Namely other applications of the invention include such a program and a storage medium in which such a program is stored.

The computer may read the program stored in the storage medium and exert the respective functions. This arrangement also ensures high-resolution output of a high-quality image without significantly increasing the required storage capacity.

BRIEF DESCRIPTION OF THE DRAWINGS

FIGS. 14A through 14F show mappings of high-resolution dot data to low-resolution dot data;

FIG. 15 conceptually shows an increase in storage capacity required for storage of high-resolution dot data converted from low-resolution dot data;

FIGS. 19A, 19B and 19C show mappings of high-resolution dot data to low-resolution dot data in the modified example of the first embodiment;

FIG. 21 conceptually shows part of a matrix setting multiple mappings to be selected for respective pixels in the overlap process of the second embodiment.

BEST MODES OF CARRYING OUT THE INVENTION

Figure 1:
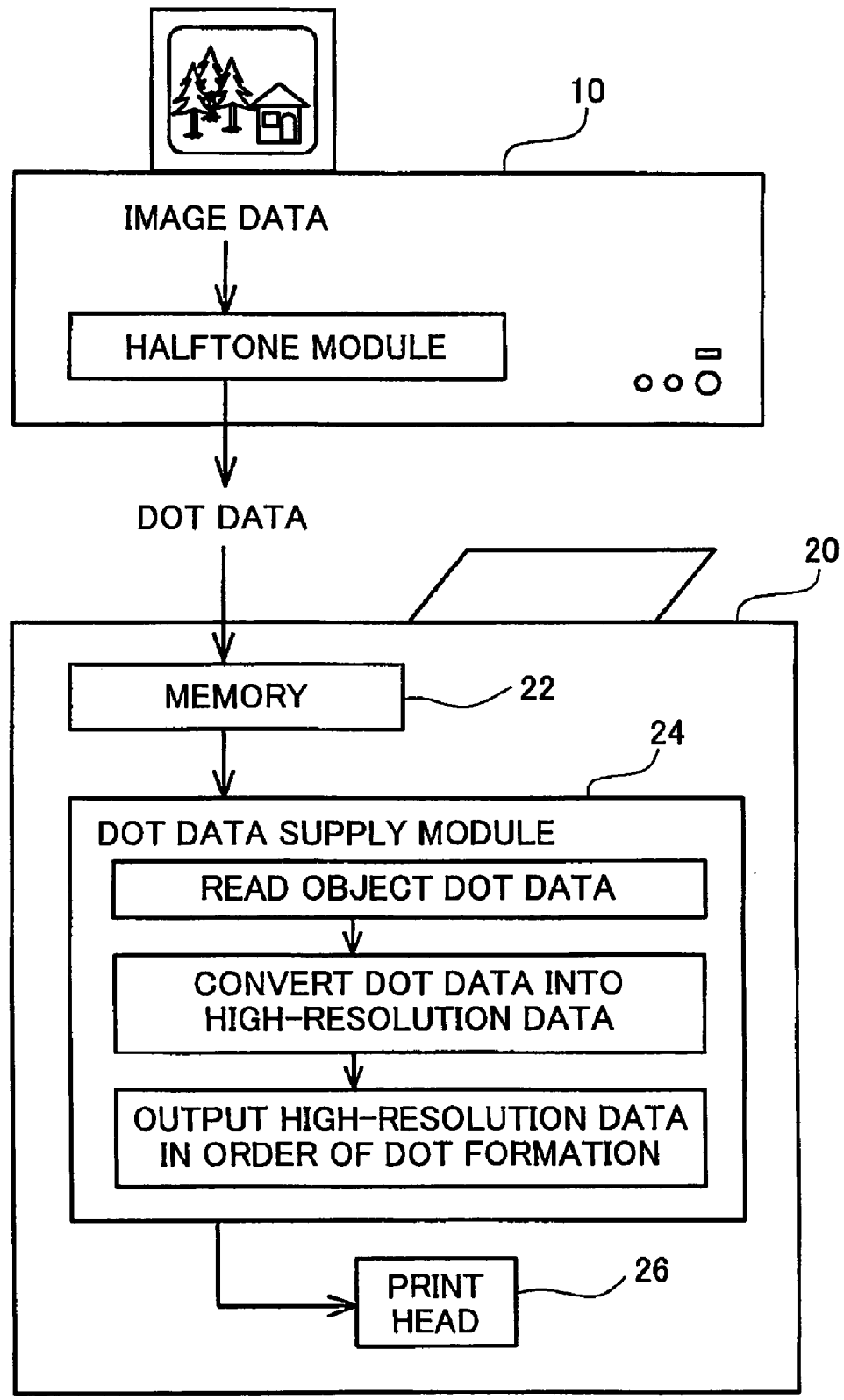
FIG. 1 schematically illustrates the configuration of a printing system including an image output device as an embodiment of the invention.

Some modes of carrying out the invention are discussed below as preferred embodiments in the following sequence to describe the objects, features, aspects, and advantages of the present invention more apparently:

A. Outline of System
B. Device Configuration
C. Outline of Image Printing Process
D. First Embodiment
 D-1. Standard Overlap Process
 D-2. Overlap Process of First Embodiment
 D-3. Modified Example of First Embodiment
E. Second Embodiment A. Outline of System The outline of a system embodying the invention is described with reference to FIG. 1, prior to detailed description of embodiments. FIG. 1 schematically illustrates the configuration of a printing system including an image output device as an embodiment of the invention. The illustrated printing system includes a computer 10 in combination with a printer 20 functioning as an image output device. The computer 10 executes a predetermined series of image processing with regard to an object image to be output and thereby generates dot data, which are then transmitted to the printer 20. A halftone module built in the computer 10 takes charge of the series of image processing and determines the dot on-off state of each pixel included in input image data to generate dot data.

The printer 20 used in this embodiment is a dot printer that creates dots on an output medium, such as printing paper, to print an image. The printer 20 includes a memory 22 working as a dot data storage unit, a dot data supply module 24, and a print head 26 working as dot formation elements. Dot data transmitted from the computer 10 are temporarily stored in the memory 22. Although the dot data are sent from the computer 10 in the printing system of FIG. 1, a halftone module may alternatively be built in the printer 20 and generate dot data from input image data. In this modified structure, the dot data output from the internal halftone module are stored in the memory 22.

The print head 26 continuously shifts relative to printing paper and accordingly forms a dot array or an alignment of dots on the printing paper. The print head 26 simultaneously creates multiple dots at preset intervals, so as to form multiple dot arrays simultaneously at the preset intervals. The dot data supply module 24 reads dot data corresponding to the multiple dot arrays to be formed by the print head 26 from the memory 22 and supplies the dot data to the print head 26, in synchronism with the relative motion of the print head 26 to the printing paper. The print head 26 creates dots corresponding to the received dot data and thereby completes a resulting printed image on the printing paper.

In the dot printer of printing an image in the above manner, the resolution enhancement of the output image naturally results in improving the printing quality. The higher resolution of the image data, however, increases the total number of pixels and thus undesirably expands the volume of the dot data. The memory 22 is accordingly required to have a greater storage capacity for the large volume of the dot data. The increased number of pixels obviously extends the processing time for generation of dot data and interferes with quick image output.

The printer 20 shown in FIG. 1 accordingly adopts the following strategy to supply dot data to the print head 26. The printer 20 receives low-resolution dot data from the computer 10 and stores the received low-resolution dot data in the memory 22. The dot data supply module 24 reads the low-resolution dot data corresponding to dot arrays to be formed by the print head 26 from the memory 22, converts the low-resolution dot data into high-resolution data, and supplies the converted high-resolution data to the print head 26 in a preset order of dot formation by the print head 26.

The dot data stored in the memory 22 are the low-resolution data and thereby do not occupy the large storage capacity. The dot data supply module 24 sequentially reads out and converts the low-resolution dot data, which correspond to object dot arrays to be currently formed by the print head 26, into the high-resolution data. The storage capacity required for the dot data supply module 24 is thus not significantly large. The halftone module in the computer 10 is required to generate only the low-resolution dot data. This ensures quick generation of dot data from image data and prompt resulting image output. An image output device and a corresponding image output method to actualize this technique of the invention are described in detail below with reference to some embodiments.

B. Device Configuration

Figure 2:
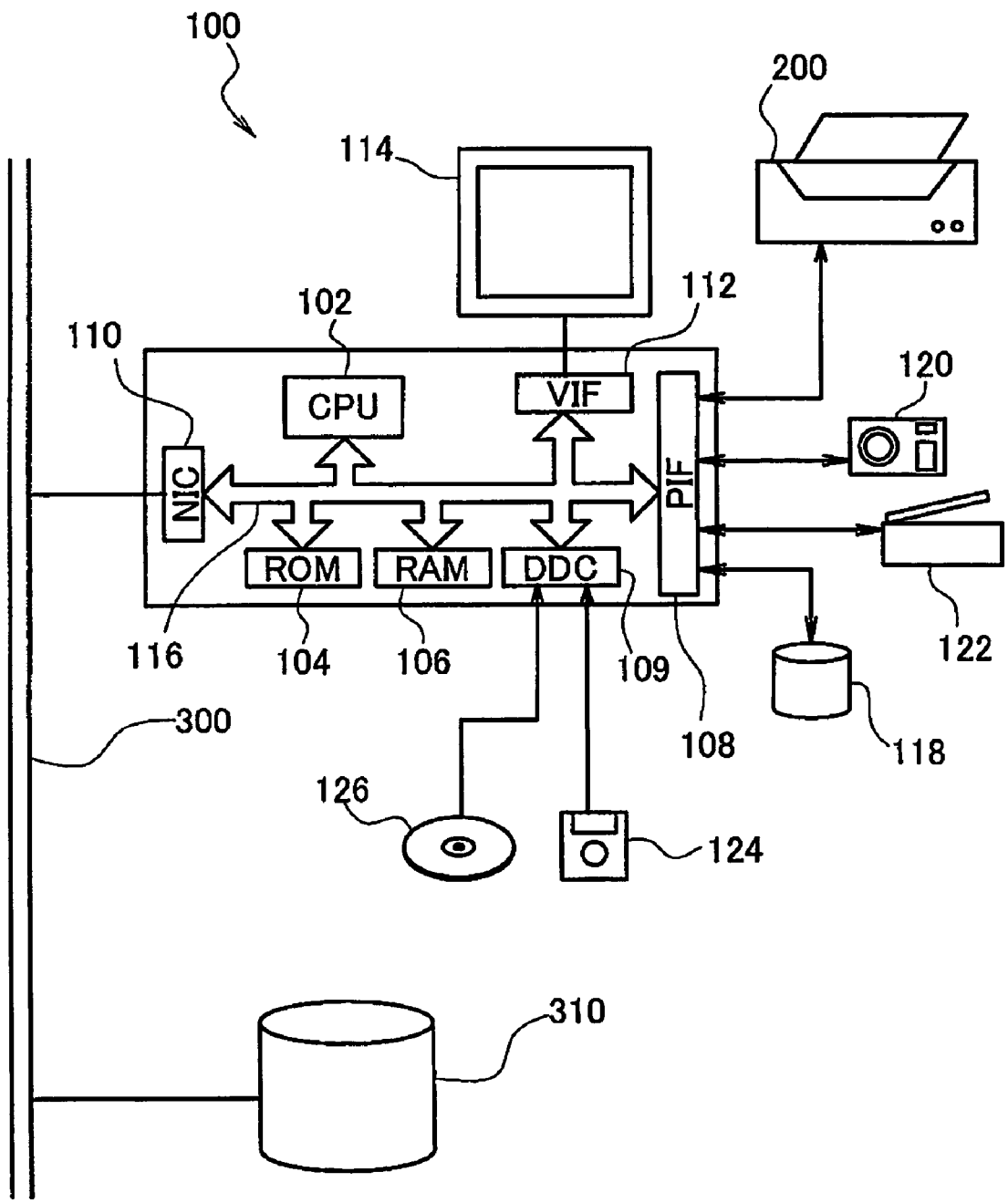
FIG. 2 schematically illustrates the configuration of a computer functioning as an image processing device in one embodiment of the invention.

FIG. 2 schematically illustrates the configuration of a computer 100 functioning as an image processing device in one embodiment of the invention. The computer 100 includes a CPU 102, a ROM 104, and a RAM 106, which are interconnected via a bus 116. The computer 100 has a disk controller DDC 109 used to read data from a flexible disk 124 and a compact disk 126, a peripheral equipment interface PIF 108 used to receive and transmit data from and to peripheral equipment, and a video interface VIF 112 used to actuate a CRT 114. A hard disk 118 and a printer 200 (discussed below) are connected to the PIF 108. Connection of a digital camera 120 or a color scanner 122 to the PIF 108 enables images taken by the digital camera 120 or the color scanner 122 to be printed by the printer 200. Insertion of a network interface card NIC 110 into the computer 100 enables the computer 100 to establish connection with a communication line 300 and fetch storage data from a storage device 310 linked to the communication line 300.

Figure 3:
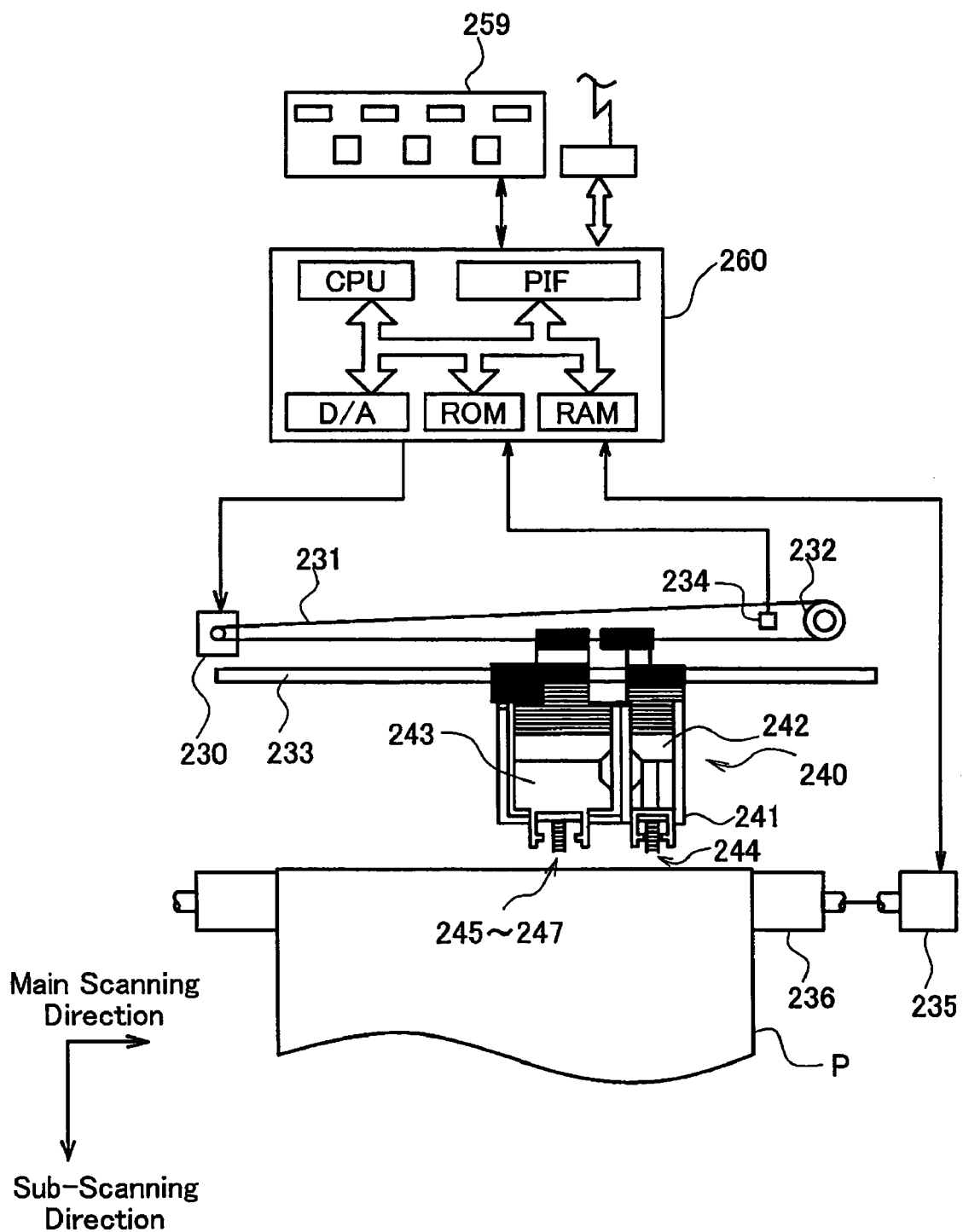
FIG. 3 schematically illustrates the structure of a printer in the embodiment.

FIG. 3 schematically illustrates the structure of the printer 200 in this embodiment. The printer 200 is a color inkjet printer that is capable of creating dots of four color inks, cyan, magenta, yellow, and black. The color inkjet printer may be capable of creating dots of totally six color inks, which include light cyan ink having a lower dye density or pigment density and light magenta ink having a lower dye density or pigment density, in addition to the above four color inks. In the description below, cyan ink, magenta ink, yellow ink, black ink, light cyan ink, and light magenta ink may be expressed simply as C ink, M ink, Y ink, K ink, LC ink, and LM ink, respectively.

As illustrated, the color printer 200 has a mechanism of actuating a print head 241 mounted on a carriage 240 to eject inks and create dots, a mechanism of activating a carriage motor 230 to move the carriage 240 back and forth along a shaft of a platen 236, a mechanism of activating a paper feed motor 235 to feed printing paper P, and a control circuit 260 that controls the formation of dots, the shift of the carriage 240, and the feed of the printing paper P.

An ink cartridge 242 for storing the K ink and another ink cartridge 243 for storing the C, M, and Y inks are attached to the carriage 240. The respective inks in the ink cartridges 242 and 243 attached to the carriage 240 are supplied through non-illustrated ink conduits to corresponding ink ejection heads 244 through 247 of the respective colors formed on the bottom face of the print head 241. The ink ejection heads 244 through 247 of the respective colors eject ink droplets of the supplied color inks to create ink dots on a printing medium.

The control circuit 260 includes a CPU, a ROM, a RAM, a peripheral equipment interface PIF, and a D-A converter that converts digital data into analog signals. One possible modification may replace the CPU with a hardware or firmware structure to exert the required functions. The control circuit 260 controls the operations of the carriage motor 230 and the paper feed motor 235 to regulate main scans and sub-scans of the carriage 240. The control circuit 260 also actuates the print head 241 to eject ink droplets at adequate timings in synchronism with the main scans and the sub-scans of the carriage 240. The ink ejection heads 244 through 247 of the respective colors eject ink droplets at the adequate timings under control of the control circuit 260, so as to create ink dots on the printing paper P and print a resulting color image.

Any of diverse methods may be applied to eject ink droplets from the ink ejection heads of the respective colors. The available techniques include a method that uses piezoelectric elements for ejection of ink droplets and a method that uses heaters located in respective ink conduits to make bubbles in the ink conduits for ejection of ink droplets. The technique of the invention is not restricted to the inkjet printers that eject inks, but is also applicable to printers that take advantage of thermal transfer to create ink dots on a printing medium and printers that take advantage of static electricity to make toners of respective colors adhere to a printing medium.

Figure 4:
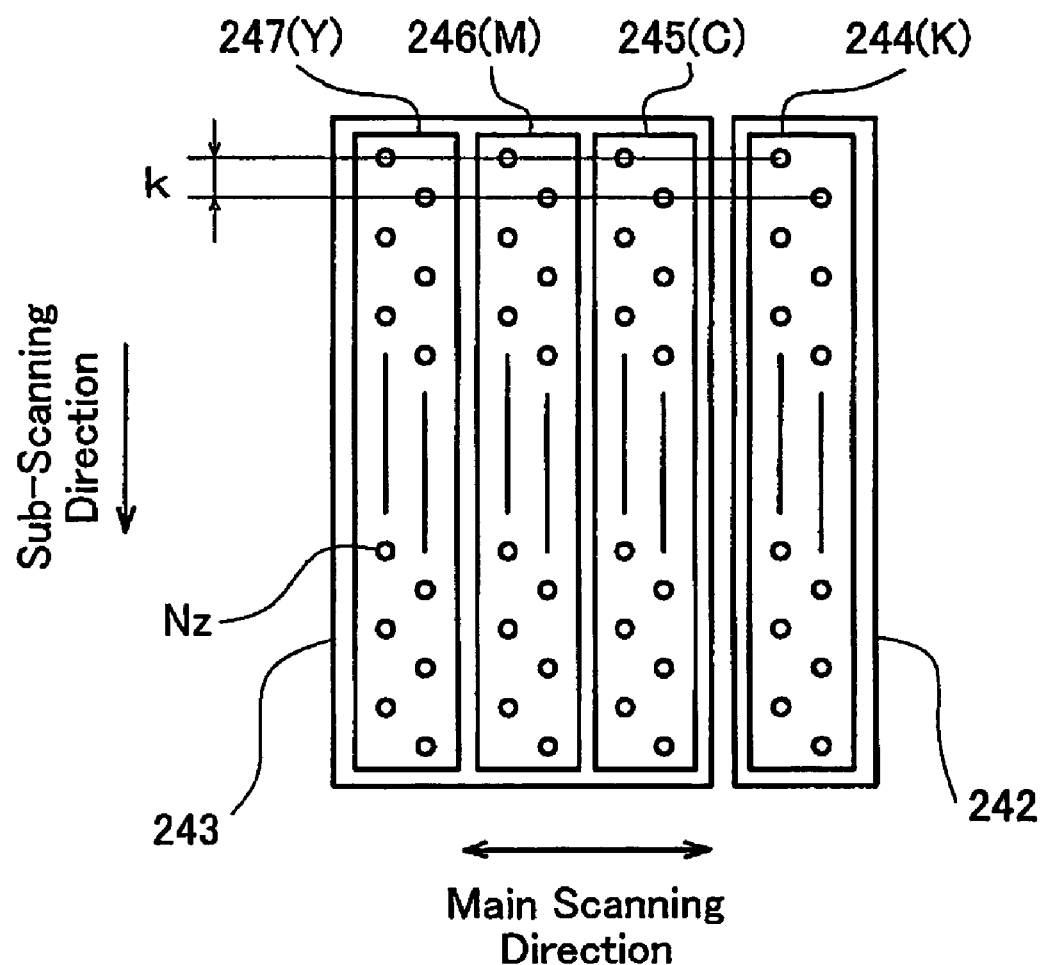
FIG. 4 shows an arrangement of multiple nozzles formed in bottom faces of ink ejection heads of respective colors to eject ink droplets of the corresponding colors.

FIG. 4 shows an arrangement of multiple nozzles Nz formed in bottom faces of the ink ejection heads 244 through 247 of the respective colors to eject ink droplets of the corresponding colors. As illustrated, four nozzle arrays for ejecting ink droplets of the respective color inks are formed on the bottom face of the respective ink ejection heads 244 through 247. Each nozzle array includes 48 nozzles Nz arranged in zigzag at a fixed nozzle pitch 'p'. These nozzles are activated under control of the control circuit 260 to eject ink droplets and thereby create ink dots on the printing paper.

Figure 5A:
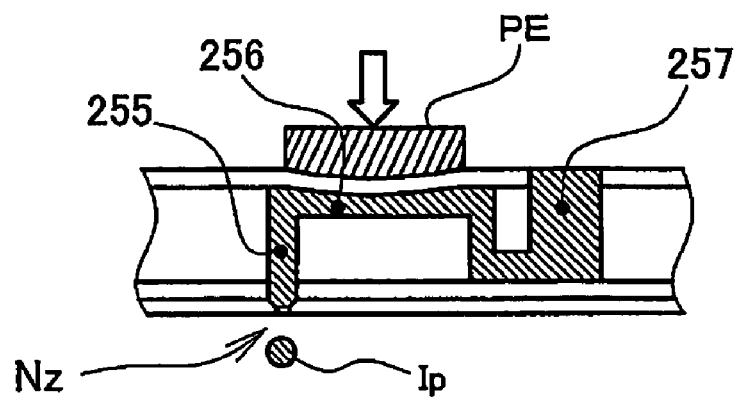
FIGS. 5A and 5B show the principle of creating variable size dots by regulation of the size of ejected ink droplets.

The printer 200 of the embodiment is capable of regulating the size of the ejected ink droplets and thereby the size of the resulting ink dots. Prior to the method of creating ink dots of varying sizes, the description regards the internal structure of the nozzles for ejecting the respective color inks in the printer 200. FIG. 5A shows the internal structure of a nozzle for ejecting ink. Each of the ink ejection heads 244 through 247 of the respective color inks has plurality of these nozzles. As illustrated, each nozzle has an ink conduit 255 and an ink chamber 256, and a piezoelectric element PE is located above the top face of the ink chamber 256. Attachment of the ink cartridges 242 and 243 to the carriage 240 causes each ink kept in the cartridges 242 and 243 to be flowed into the ink chamber 256 via an ink reservoir 257. As is known in the art, the piezoelectric element PE deforms its crystal structure under application of a voltage to attain extremely high-speed conversion of electrical energy into mechanical energy. In the structure of the embodiment, application of a voltage of a specified waveform between electrodes provided on both ends of the piezoelectric element PE deforms the side wall of the ink chamber 256. Such deformation reduces the total volume of the ink chamber 256 and presses an amount of ink corresponding to the reduced volume out of the nozzle Nz as an ink droplet Ip. The ink droplet Ip is soaked into the printing paper P set on the platen 236 to create an ink dot on the printing paper.

Figure 5B:
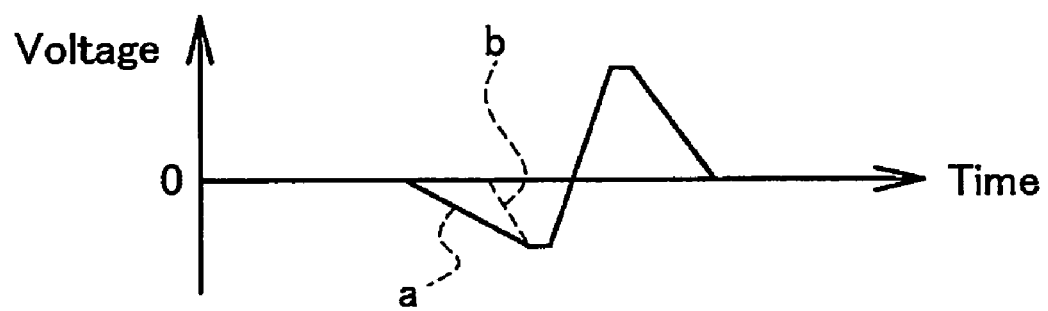

FIG. 5B shows the principle of varying the size of the ejected ink droplet by regulation of the voltage waveform applied to the piezoelectric element PE. Application of a negative voltage to the piezoelectric element PE causes ink kept in the ink reservoir 257 to be sucked into the ink chamber 256. Subsequent application of a positive voltage to the piezoelectric element PE reduces the total volume of the ink chamber 256 and thereby causes ejection of the ink droplet Ip from the nozzle. An adequate level of ink suction speed leads to suction of a preset quantity of ink corresponding to the reduced volume of the ink chamber 256. An excess level of ink suction speed, however, prevents ink kept in the ink reservoir 257 from being smoothly flowed into the ink chamber 256, due to the passage resistance between the ink reservoir 257 and the ink chamber 256. The ink in the ink conduit 255 accordingly flows back into the ink chamber 256 and makes the ink interface significantly recessed at the opening of the nozzle. A voltage waveform 'a' shown by the solid line in FIG. 5B represents ink suction at an adequate speed, while a voltage waveform 'b' shown by the broken line represents ink suction at an excess speed.

Application of a positive voltage to the piezoelectric element PE under the condition of a sufficient supply of ink into the ink chamber 256 causes an ink droplet Ip of a preset quantity corresponding to the volume reduction of the ink chamber 256 to be ejected from the nozzle Nz. Application of a positive voltage under the condition of an insufficient supply of ink that gives a significantly recessed ink interface, on the other hand, leads to ejection of a small ink droplet. The printer 200 of this embodiment varies the waveform of the negative voltage applied for ink suction to adjust the ink suction speed and thereby regulates the size of the ejected ink droplet. The printer 200 is capable of three variable size dots, that is, a large-size dot, a medium-size dot, and a small-size dot.

These three variable size dots are not restrictive at all, and a greater number of variable size dots may be created. Another applicable method may adjust the number of smaller ink droplets ejected simultaneously to regulate the size of ink dots formed on the printing paper.

In the color printer 200 having the hardware configuration discussed above, the carriage motor 230 is driven to move the ink ejection heads 244 through 247 of the respective colors in a main scanning direction relative to the printing paper P, while the paper feed motor 235 is actuated to feed the printing paper P in a sub-scanning direction. The control circuit 260 repeats main scans and sub-scans of the carriage 240 and drives nozzles at adequate timings to eject ink droplets. This creates ink dots at required positions to print a resulting image on the printing paper P.

C. Outline of Image Printing Process

Figure 6:
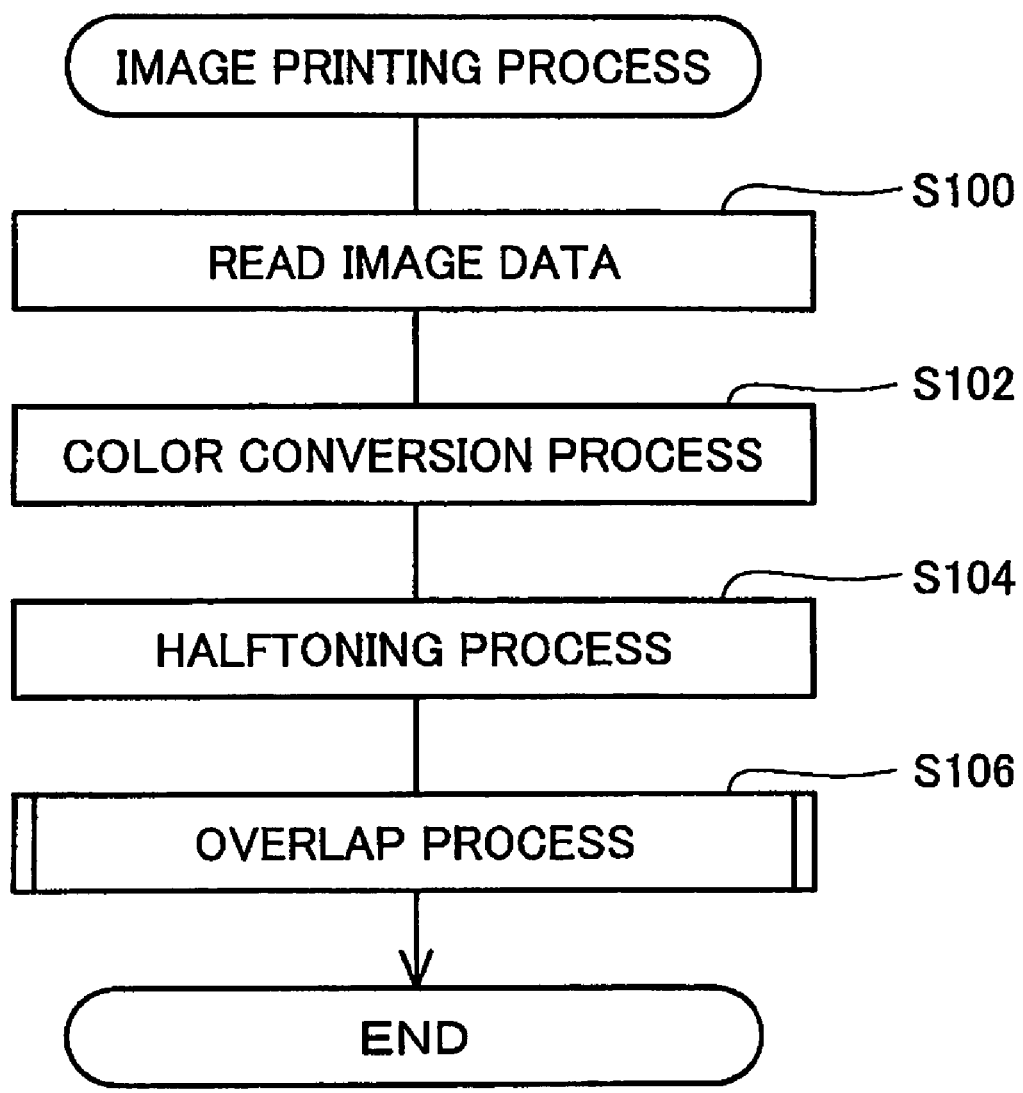
FIG. 6 is a flowchart showing a series of processing to print an image on printing paper, which is executed by the computer and the printer of the embodiment.

FIG. 6 is a flowchart showing an image printing process executed by both the computer 100 and the printer 200 of the embodiment to convert input image data into dot data by a preset series of image processing and print a resulting image on printing paper. The first part of the image printing process to the halftoning process and generation of dot data is executed by the internal CPU of the computer 100, whereas the latter part including the overlap process is executed by the internal CPU of the control circuit 260 in the printer 200. The image printing process of the embodiment is described below with reference to the flowchart of FIG. 6.

When the image printing process starts, the computer 100 first reads object image data to be converted (step S100). The object image data is RGB color image data in this embodiment, although monochromatic image data may be replaced with the color image data.

The input object color image data goes through a color conversion process (step S102). The color conversion process converts the RGB color image data expressed by combinations of tone values of the colors R, G, and B into image data expressed by combinations of tone values of respective colors used for printing. As mentioned above, the printer 200 prints an image with the four color inks C, M, Y, and K. The color conversion process of this embodiment accordingly converts the image data expressed by the tone values of the colors R, G, and B into image data expressed by the tone values of the four colors C, M, Y, and K.

Figure 7:
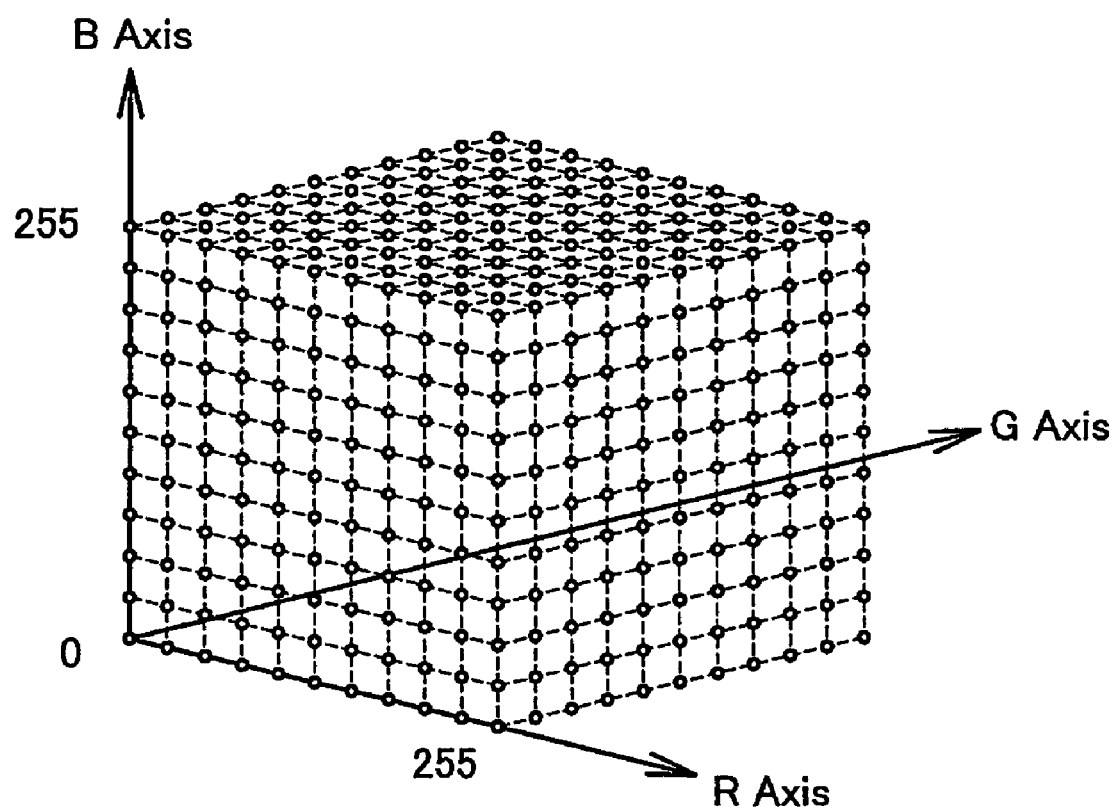
FIG. 7 conceptually shows a color conversion table that is referred to in a color conversion process.

Prompt color conversion is implemented by referring to a three-dimensional numerical table called a color conversion table (LUT). FIG. 7 conceptually shows the LUT that is referred to for the color conversion. There is a color space defined by three orthogonal axes, R, G, and B. Every RGB image data is expressible by one coordinate point in this color space. A large number of lattice points are set by subdivision of the respective R, G, and B axes in the color space, where each lattice point represents RGB image data. A combination of the tone values of the respective colors C, M, Y, and K corresponding to each RGB image data is mapped to each lattice point. The LUT is formed as the three-dimensional numerical table that stores a combination of the tone values of the respective colors C, M, Y, and K at each lattice point set in the color space. Reference to the storage of the LUT representing the mapping of the tone data of the respective colors C, M, Y, and K to the RGB color image data ensures prompt color conversion from the RGB color image data into tone data of the respective colors C, M, Y, and K.

After conversion into the tone data of the respective colors C, M, Y, and K, the computer 100 starts a halftoning process (step S104). The image data obtained by the color conversion takes a tone value in a range of 0 to 255 with regard to each pixel, where the data length is 1 byte. The inkjet printer expresses an image by formation of dots and is designed to take only one of the two states, dot-on and dot-off, with regard to each pixel. The image data of 256 tones accordingly needs conversion into data expressed by the dot on-off state (dot data) with regard to each pixel. The halftoning process implements such conversion from image data into dot data. As described above, the printer 200 of this embodiment is capable of creating three variable size dots, the large-size dot, the medium-size dot, and the small-size dot. The halftoning process accordingly determines the dot on-off state of these three variable size dots with regard to each pixel.

Any of diverse techniques including an error diffusion method and a dither method is applicable to the halftoning process. The error diffusion method diffuses an error of tone expression, which arises in one pixel due to selection of either the dot-on state or the dot-off state, into peripheral pixels and determines the dot on-off state in each object pixel to eliminate the sum of error divisions diffused from peripheral pixels to the object pixel. The dither method compares the tone values of image data in respective pixels with corresponding threshold values that are set at random in a dither matrix and determines dot formation in pixels having the greater image data than the corresponding threshold values and no dot formation in pixels having the smaller image data than the corresponding threshold values, so as to generate dot data of the respective pixels.

The halftoning process of this embodiment adopts the dither method to generate dot data, although any other technique is applicable. Determination of the dot on-off state in each pixel by the dither method is described briefly below.

Figure 8:
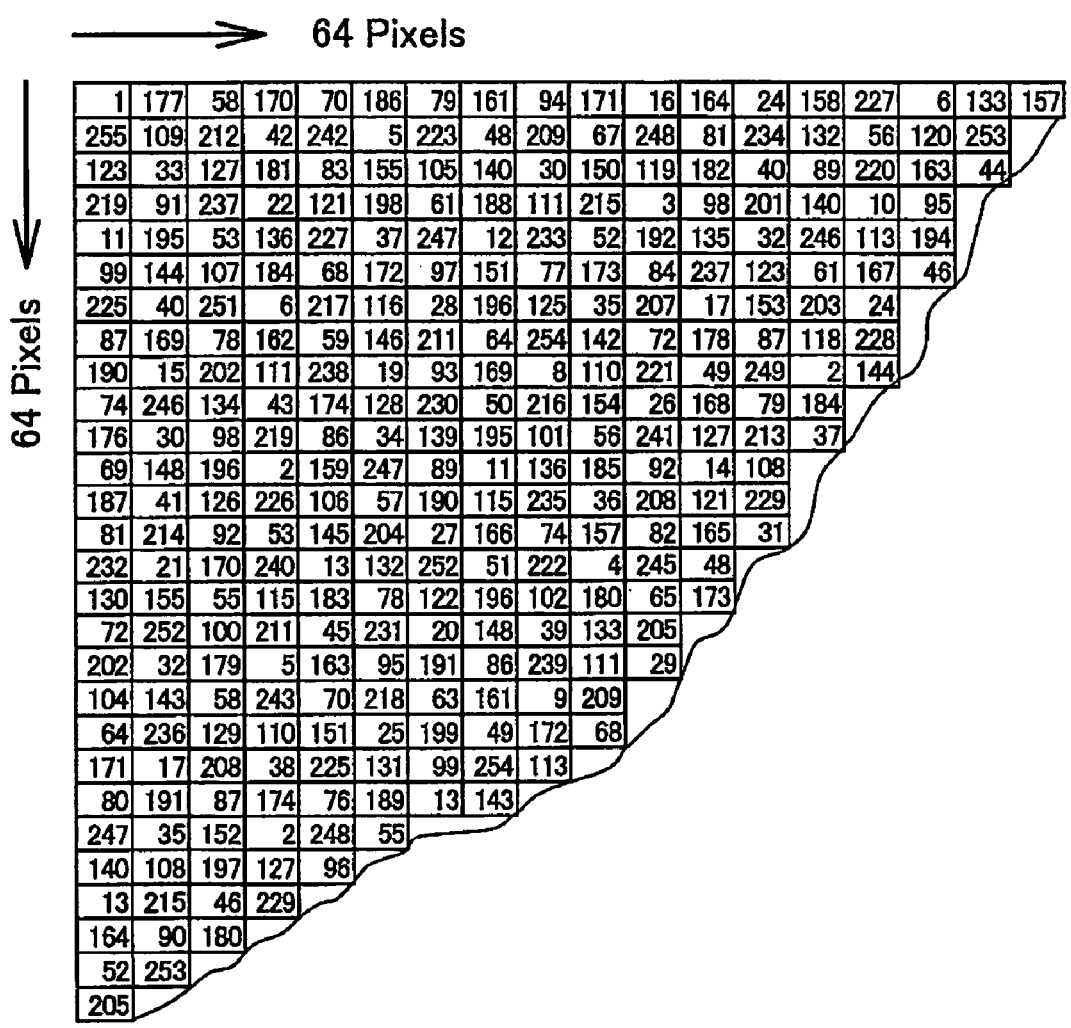
FIG. 8 shows part of a dither matrix.

FIG. 8 shows part of a dither matrix. This dither matrix stores threshold values, which are selected at random throughout a tone value range of 0 to 255 and are allocated to a total of 4096 pixels of 64 pixels in length and 64 pixels in width. In this embodiment, the image data are 1-byte data and the tone values allocated to the respective pixels are in the range of 0 to 255, so that the threshold values in the dither matrix are selected in the tone value range of 0 to 255. The dither matrix is not restricted to the size of 64 pixels in both length and width as in the example of FIG. 8, but may have any desired size having different numbers of pixels in length and in width or having the same numbers of pixels in both length and width.

Figure 9:
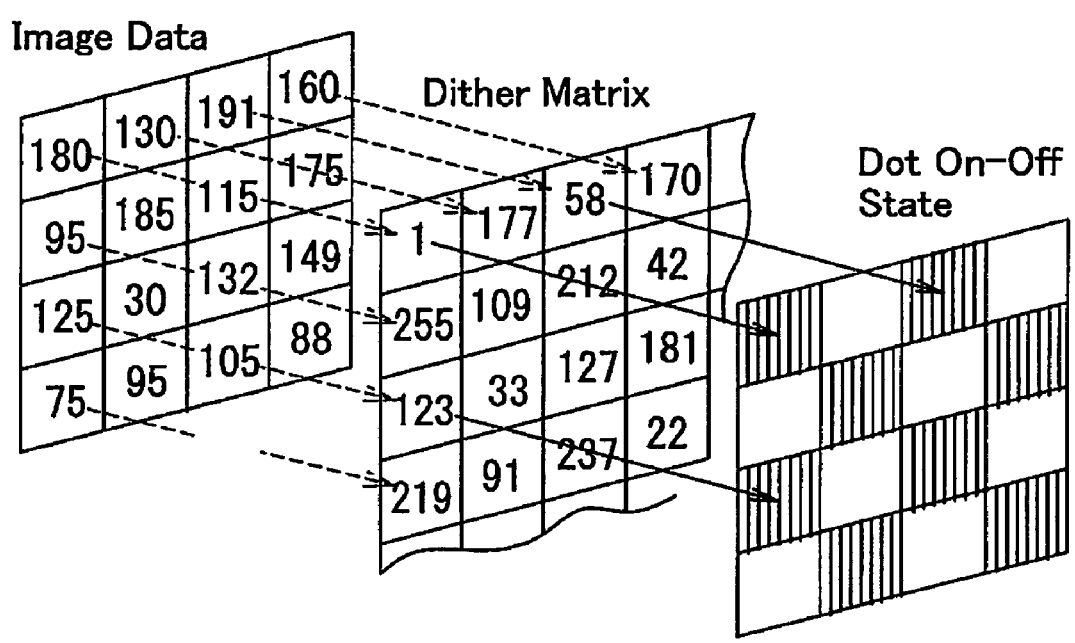
FIG. 9 conceptually shows a process of determining the dot on-off state of individual pixels by referring to the dither matrix.

FIG. 9 conceptually shows a process of determining the dot on-off state of individual pixels by referring to the dither matrix. The procedure of determining the dot on-off state first compares the tone value of each pixel selected as an object to be processed (target pixel) with a threshold value stored at the corresponding position in the dither matrix. Each arrow of thin broken line in FIG. 9 represents comparison between the tone value of each target pixel and a threshold value stored at the corresponding position in the dither matrix. When the tone value of the target pixel is greater than the corresponding threshold value in the dither matrix, the process determines dot formation in the target pixel. When the tone value of the target pixel is smaller than the corresponding threshold value in the dither matrix, on the contrary, the process determines no dot formation in the target pixel. In the illustrated example of FIG. 9, the tone value allocated to a pixel on the upper left corner of image data is '180', while the threshold value stored at the corresponding position in the dither matrix is '1'. Since the tone value '180' of the image data is greater than the corresponding threshold value '1' in the dither matrix, the process determines dot formation in the pixel on the upper left corner. Each arrow of solid line in FIG. 9 represents a process of determining dot formation in a target pixel and writing the result of determination at a corresponding position in a memory. An adjoining pixel on the right side of the upper left pixel has the tone value '130', while the corresponding threshold value in the dither matrix is '177'. The threshold value is greater than the tone value, so that the process determines no dot formation in this pixel. In this manner, the dot on-off state in each pixel is determined by comparing the tone value of the image data with the corresponding threshold value set in the dither matrix.

The processing of step S104 in the flowchart of FIG. 6 compares the tone values of the respective colors C, M, Y, and K obtained by the color conversion with the threshold values set in the dither matrix and determines the dot on-off state in the respective pixels. As mentioned previously, the printer 200 of the embodiment is capable of creating the three variable size dots, that is, the large-size dot, the medium-size dot, and the small-size dot. The dot on-off state is determined at step S104 with regard to the three variable size dots, that is, the large-size dot, the medium-side dot, and the small-size dot.

Any of diverse proposed procedures may be adopted to determine the dot on-off state with regard to the large-size dot, the medium-size dot, and the small-size dot. One applicable procedure provides separate dither matrixes for the large-size dot, the medium-size dot, and the small-size dot, compares the image data of the respective colors obtained by the color conversion with the settings of the respective dither matrixes to determine the dot on-off state of the respective variable size dots in the respective pixels. Another applicable procedure converts the image data obtained by the color conversion into tone data of the large-size dot, tone data of the medium-size dot, and tone data of the small-size dot with regard to the respective colors and determines the dot on-off state in the respective pixels based on these converted tone data. Still another applicable procedure compares the tone data of the large-size dot with the corresponding threshold values in the dither matrix to determine the dot on-off state of the large-size dot. With regard to pixels determined to have no formation of the large-size dot, the procedure sums up the tone data of the large-size dot and the tone data of the medium-size dot to generate intermediate data. The procedure compares the intermediate data with the corresponding threshold values in the dither matrix and determines formation of the medium-size dot in pixels having the greater intermediate data than the threshold values. With regard to pixels determined to have no formation of the large-size dot or the medium-size dot, the procedure adds the tone data of the small-size dot to the intermediate data to update the intermediate data. The procedure compares the updated intermediate data with the corresponding threshold values in the dither matrix and determines formation of the small-size dot in pixels having the greater updated intermediate data than the threshold values, while determining no formation of any variable size dot in pixels having the smaller updated intermediate data than the threshold values.

The determination of the dot on-off state in the respective pixels with regard to the large-size dot, the medium-size dot, and the small-size dot is not directly related to the essential part of this embodiment and is thus not described in detail here. The halftoning process of this embodiment eventually selects one of the four available states, 'formation of the large-size dot', 'formation of the medium-size dot', 'formation of the small-size dot', and 'no dot formation' in all the pixels of a resulting image. The image data of the respective colors obtained by the color conversion are thus converted into dot data of the respective colors representing the settings selected among the four available states, formation of the large-size dot, formation of the medium-size dot, formation of the small-size dot, and no dot formation, in the respective pixels. At step S104 in the flowchart of FIG. 6, the converted dot data of the respective colors are output from the computer 100 to the control circuit 260 in the printer 200.

The control circuit 260 of the printer 200 receives the dot data of the respective colors from the computer 100, temporarily stores the received dot data in the internal RAM, and executes an overlap process (step S106). As described previously with reference to FIG. 3, the printer 200 drives the print head 241 in main scans of the carriage 240 to create dots on the printing paper and thereby print a resulting image. The print head 241 has the multiple nozzles provided for each color as shown in FIG. 4 and is designed to create multiple dots simultaneously. These multiple nozzles are arranged at the intervals of the nozzle pitch k, so that the multiple dots created simultaneously have the intervals of the nozzle pitch k. The print head 241 creates dots not sequentially from one end of an image but at the intervals of the nozzle pitch k. Namely the print head 241 creates dots on the printing paper in a specific order that is different from the sequence of pixels on an image.

The order of dot formation by the print head 241 is different from the pixel sequence on the image, because of the following reason. One dot array aligned in the main scanning direction can be formed by one main scan. According to the image quality requirement, the dot formation technique may, however, complete one dot array by multiple main scans and create dots in pixels at preset intervals in the main scanning direction by each main scan, as discussed later. The order of dot formation in the pixels at the preset intervals in the main scanning direction is also different from the pixel sequence on the image. The overlap process rearranges the dot data created by determination of the dot on-off state of the respective pixels of an image in an order of actual dot formation by the print head 241 and sequentially supplies the rearranged dot data to the print head 241. The print head 241 ejects ink droplets according to the supplied dot data to create dots on the printing paper.

The overlap process sequentially reads out dot data, which are stored in a certain area on the internal RAM of the control circuit 260, in the order of dot formation by the print head 241 and writes the sequentially read-out dot data in another area on the internal RAM. The resolution enhancement for the higher-quality image increases the number of pixels and thereby the total volume of the dot data. The increased volume of the dot data undesirably occupies a large storage capacity of the RAM. In order to eliminate such potential drawbacks, the image printing process of this embodiment executes a specific overlap process as discussed later. The specific overlap process of this embodiment enables a high-resolution image to be printed without significantly increasing the required storage capacity of the RAM, as described later in detail.

The print head 241 moves on the printing paper in main scans of the carriage 240 and ejects ink droplets according to the supplied dot data, so as to create dots at required positions on the printing paper and thereby print a resulting image.

D. First Embodiment

The printer 200 executes the overlap process prior to printing a processed image. The overlap process rearranges the dot data stored on the internal RAM of the control circuit 260 in the order of actual dot formation by the print head 241. The resolution enhancement for the high-quality print image undesirably increases the required storage capacity of the RAM for storage of the dot data. The procedure of the first embodiment executes a specific overlap process as described later to obtain a high-quality print image without significantly increasing the required storage capacity. Prior to the details of the specific overlap process of the first embodiment, the standard overlap process is explained briefly.

D-1. Standard Overlap Process

Figure 10A:
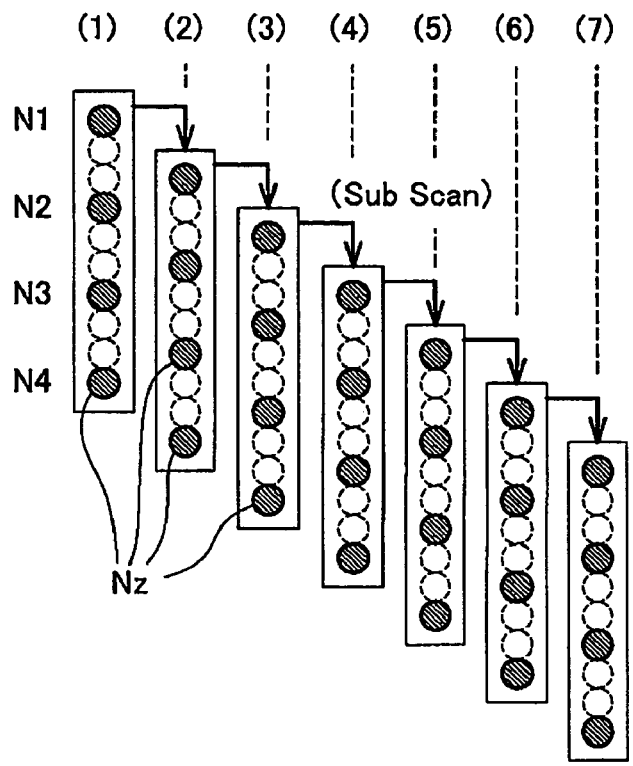
FIGS. 10A and 10B conceptually show a process of dot formation on printing paper by repeated main scans and sub-scans of a print head.
Figure 10B:
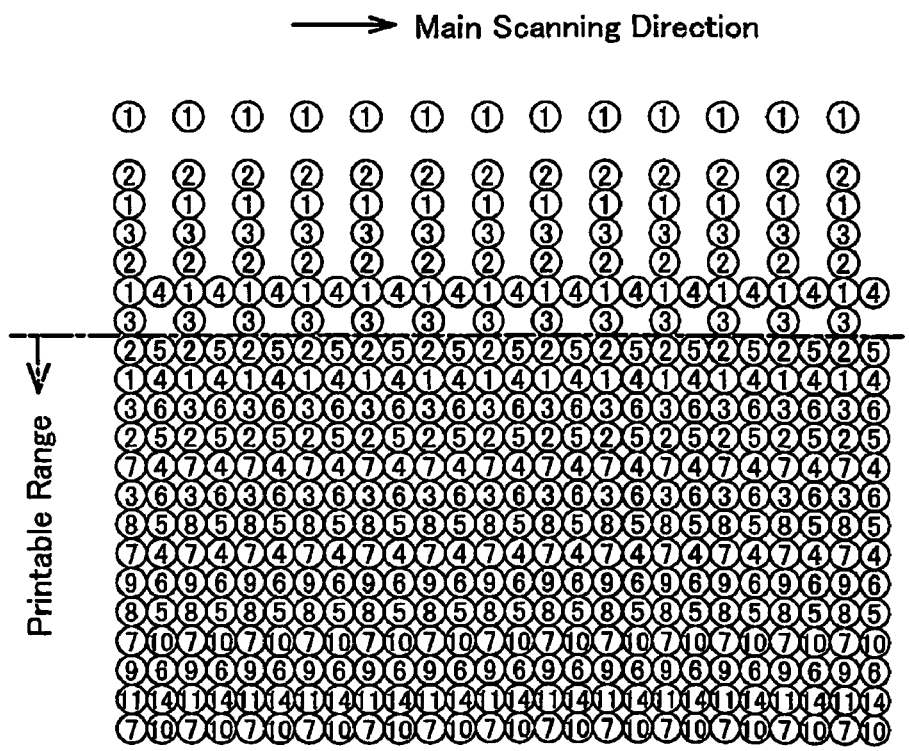

FIGS. 10A and 10B conceptually show a process of dot formation on printing paper by repeated main scans and sub-scans of the print head 241. As described previously with reference to FIG. 4, the print head 241 of the embodiment actually has a large number of nozzles provided for each color (48 nozzles provided for each color). For the simplicity of explanation, however, in the illustrated example of FIG. 10A, it is assumed that a print head has only four nozzles N1, N2, N3, and N4. The description is on the assumption of the nozzle pitch set to 3, completion of each dot array by two main scans, and formation of only one size dot.

In the illustration of FIG. 10A, the print head gradually moves relative to the printing paper by sub-scans. A long rectangle shown in FIG. 10A represents a print head for each color. As illustrated, the print head of each color has four nozzles at the nozzle pitch of '3'. There is accordingly a space corresponding to two nozzles between adjoining nozzles (a distance corresponding to 3 nozzle diameters between the centers of adjoining nozzles) as shown by the broken lines.

FIG. 10B shows ejection of ink droplets in main scans of the print head to create dots on the printing paper with repeated sub-scans of FIG. 10A. Open circles shown in FIG. 10B represent dots created on the printing paper. The actual sub-scan feeds the printing paper and does not move the print head 241 in the sub-scanning direction as described previously with reference to FIG. 3. For convenience of explanation, however, the print head moves relative to the printing paper in the illustration of FIG. 10A.

The printing process executes a first main scan with ejection of ink droplets at a position (1) of the print head. This first main scan creates dots with the encircled number '1' in FIG. 10B on the printing paper. The dots of the encircled number '1' are created in every other pixel, since each dot array is completed by two main scans. Dots are created in every third pixel in the case of completion of each dot array by three main scans, while being created in every fourth pixel in the case of completion of each dot array by four main scans.

The print head then moves by the space of two nozzles in the sub-scanning direction to a position (2) in FIG. 10A. Each solid arrow in FIG. 10A represents a sub-scan of the print head. After the sub-scan, the printing process executes a second main scan to create dots on the printing paper. The second main scan creates dots with the encircled number '2' in FIG. 10B on the printing paper. The sub-scan shifts the print head by the space of two nozzles, while the nozzles on the print head are arranged at the intervals of three nozzles. Each dot array formed by the second main scan (the dot array with the encircled number '2') is accordingly located between the dot arrays formed by the first main scan (the dot arrays with the encircled number '1').

The printing process subsequently executes a sub-scan to shift the print head by the space of two nozzles to a position (3) and a third main scan with ejection of ink droplets to create dots with the encircled number '3'. Each dot array formed by the third main scan (the dot array with the encircled number '3') is located between the dot array formed by the first main scan (the dot array with the encircled number '1') and the dot array formed by the second main scan (the dot array with the encircled number '2'). The first main scan forms four dot arrays, which are arranged at the intervals of the two vacant dot arrays. The second main scan creates dots to fill one of the two vacant dot arrays, while the third main scan creates dots to fill the remaining one of the two vacant dot arrays. In this manner, the printing process repeats dot formation with little shifts of the print head in sub-scans. The third main scan forms new dot arrays to fill up the vacant space between the existing dot arrays.

A fourth main scan creates dots on the dot arrays formed by the first main scan. The first main scan creates dots in every other pixel as mentioned above, and the fourth main scan creates new dots between the existing dots. As clearly seen in FIG. 10B, the dots with the encircled number '4' formed by the fourth main scan are located between the existing dots with the encircled number '1'. The first main scan forms dots in half of one pixel array, and the fourth main scan forms dots in the remaining half of the pixel array. Namely one dot array is completed by two main scans.

After completion of one dot array, the printing process executes another sub-scan to shift the print head to a position (5) and a fifth main scan to create dots with the encircled number '5'. The fifth main scan creates dots on the dot arrays formed by the second main scan. Namely formation of dots with the encircled number '5' between the existing dots with the encircled number '2' completes new dot arrays. The printing process then executes another sub-scan to shift the print head to a position (6) and a sixth main scan to create dots with the encircled number '6'. Formation of dots with the encircled number '6' between the existing dots with the encircled number '3' completes new dot arrays. In a similar manner, a seventh main scan creates dots between the existing dots formed by the fourth main scan, and an eighth main scan creates dots between the existing dots formed by the fifth main scan.

The printing process repeats main scans to form dot arrays with sub-scans of the print head by a preset distance. On and after some main scan, dots are created without any vacancy to sequentially complete dot arrays and fill up the printing paper with dots. In the illustrated example of FIG. 10A, dots are created without any vacancy on and after the fifth main scan. Namely an effective image display area is filled with dots created on and after the fifth main scan.

The printer does not sequentially create dots from the end pixel in the effective image display area but forms dots in a preset order like a mosaic to print a resulting image. The printer executes the overlap process to rearrange the received dot data in the order of actual dot formation by the print head and then sequentially supplies the rearranged dot data to the print head.

Figure 11:
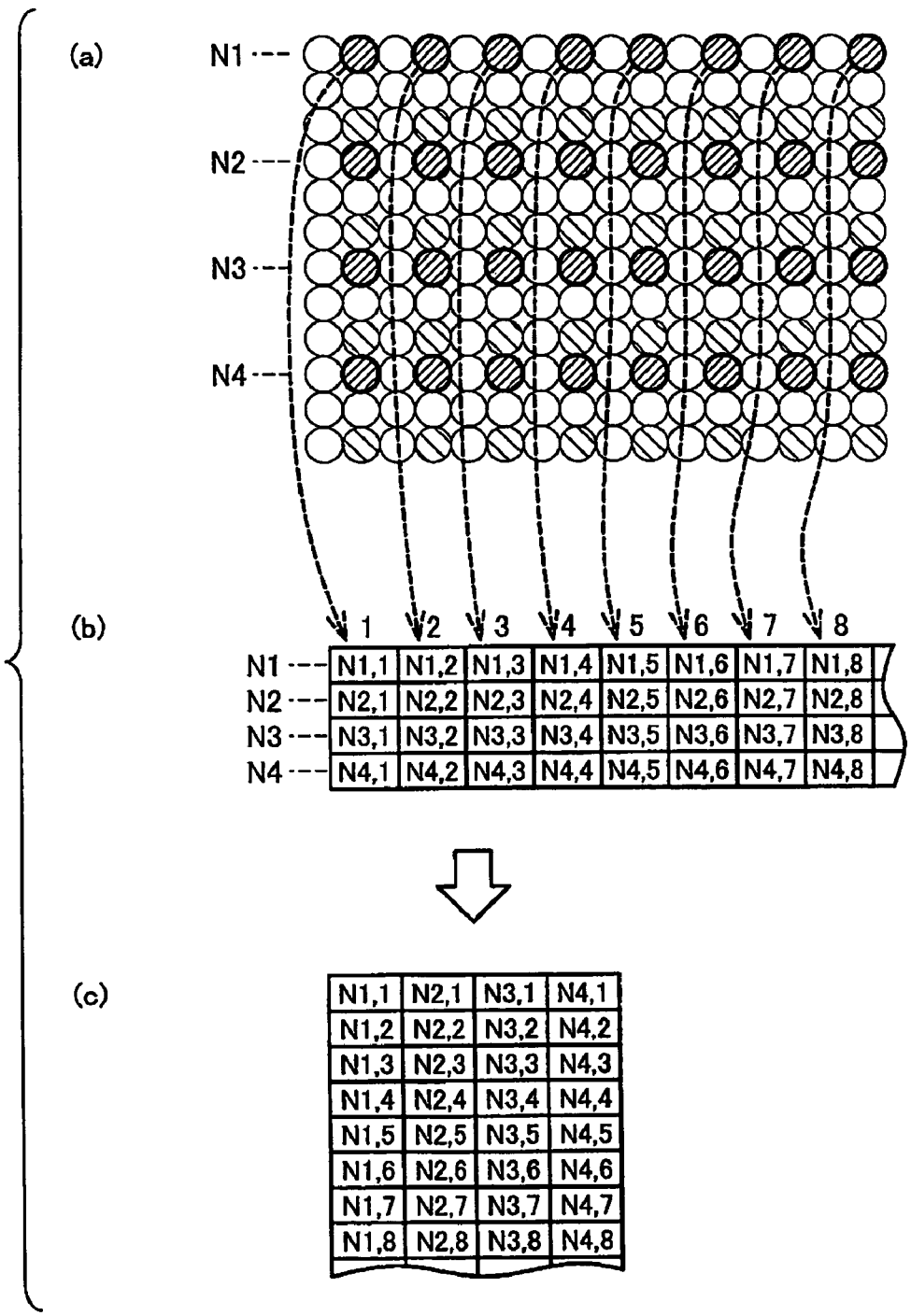
FIG. 11 shows a standard overlap process executed in a conventional printer.

FIG. 11 shows a standard overlap process executed in a conventional printer. As in the illustrated example of FIGS. 10A and 10B, it is here assumed that a print head has four nozzles arranged at intervals of a nozzle pitch '3' and that each dot array is completed by two main scans.

FIG. 11(*a*) shows storage of dot data corresponding to an upper end of an image on the internal RAM of the control circuit 260. Each circle represents a pixel included in the image with setting of one of the four available states, 'formation of the large-size dot', 'formation of the medium-size dot', 'formation of the small-size dot', and 'no dot formation'.

The description regards dot formation by a fifth main scan as an example. As described above in the illustrated example of FIG. 10, the fifth main scan forms dots in pixels of finely hatched circles in FIG. 11(a) according to the dot data. The nozzle N1 creates dots of a top most dot array in every other pixel of the finely hatched circle according to the dot data. The nozzle N2 creates dots of a fourth dot array in every other pixel of the finely hatched circle according to the dot data. The nozzle N3 creates dots of a seventh dot array in every other pixel of the finely hatched circle according to the dot data. The nozzle N4 creates dots of a tenth dot array in every other pixel of the finely hatched circle according to the dot data. The overlap process reads out the dot data stored at the intervals on the RAM and rewrites the dot data in a consecutive manner on the RAM.

FIG. 11(b) shows a process of rewriting the dot data, which are stored in the pixels of the finely hatched circles in FIG. 11(a), in a consecutive manner in a separate area on the RAM. A symbol 'N1,1' in FIG. 11(b) represents dot data in a pixel with a dot to be created first by the nozzle N1 in FIG. 11(a). A symbol 'N1,2' in FIG. 11(b) represents dot data in a pixel with a dot to be created second by the nozzle N1 in FIG. 11(a). In this manner, dot data in pixels to be created by the nozzle N1 are written in a first row. Dot data in pixels with dots to be created by the nozzle N2, dot data in pixels with dots to be created by the nozzle N3, and dot data in pixels with dots to be created by the nozzle N4 are respectively written in a second row, in a third row, and in a fourth row.

After the consecutive rewriting of the dot data to be created by the respective nozzles, the overlap process exchanges the row and the column of the consecutively written dot data. In the illustrated example of FIG. 11(b), data 'N1,2' is written at the position of the first row, the second column. The row-column exchange writes the data 'N1,2' at the new position of the second row, the first column. In a similar manner, the row-column exchange shifts data 'N2,3' from the position of the second row, the third column in FIG. 11(b) to the position of the third row, the second column. Such row-column exchange converts the data of FIG. 11(b) into data of FIG. 11(c).

As shown in FIG. 11(c), the exchange of the row and the column gives four data 'N1,1', 'N2,1', 'N3,1', and 'N4,1' written in the first row. These dot data regard the pixels with dots to be created first by the respective nozzles N1 through N4. Four data 'N1,2', 'N2,2', 'N3,2', and 'N4,2' are written in the second row. These dot data regard the pixels with dots to be created second by the respective nozzles N1 through N4. In a similar manner, dot data regarding the pixels with dots to be created third by the respective nozzles are written in the third row, and dot data regarding the pixels with dots to be created fourth by the respective nozzles are written in the fourth row. The row-column exchange gives the dot data written in the order of actual dot formation by the respective nozzles. The overlap process reads out the row-column exchanged data shown in FIG. 11(c) from the top corresponding to the number of nozzles and supplies the read-out data in synchronism with each main scan of the print head. Dots are then created sequentially according to the dot data in the pixels of the finely hatched circles shown in FIG. 11(a).

After dot formation in the object pixels by the fifth main scan in FIG. 10, the above series of printing process is repeated to create dots in next object pixels by a sixth main scan (that is, pixels of roughly hatched circles in FIG. 11(a)).

The standard overlap process reads out only the data with regard to object pixels for dot formation by the print head among the dot data stored in the pixel sequence on the RAM as shown in FIG. 11(a), rewrites the data in the consecutive manner as shown in FIG. 11(b), exchanges the row and the column of the consecutively stored data, and sequentially supplies the row-column exchanged data from the top corresponding to the number of nozzles to the print head.

In this standard overlap process, the enhanced resolution of the output image increases the volume of the dot data to be stored in the RAM. For example, an image having a resolution of 720 dpi both in the main scanning direction and in the sub-scanning direction (hereafter this resolution may be expressed as 720 dpi×720 dpi) goes through resolution enhancement, which doubles the resolution in the main scanning direction for the better printing quality. This gives a printed image having the doubled resolution of 1440 dpi in the main scanning direction and the resolution of 720 dpi in the sub-scanning direction (hereafter this resolution may be expressed as 1440 dpi×720 dpi). This doubles the volume of the dot data temporarily stored in the RAM and naturally increases the required storage capacity of the RAM. The doubled data volume extends the time required for generation of the dot data and interferes with prompt image output. The procedure of the first embodiment adopts a specific overlap process as discussed below to print an output image of the enhanced resolution without causing such drawbacks.

D-2. Overlap Process of First Embodiment

Figure 12:
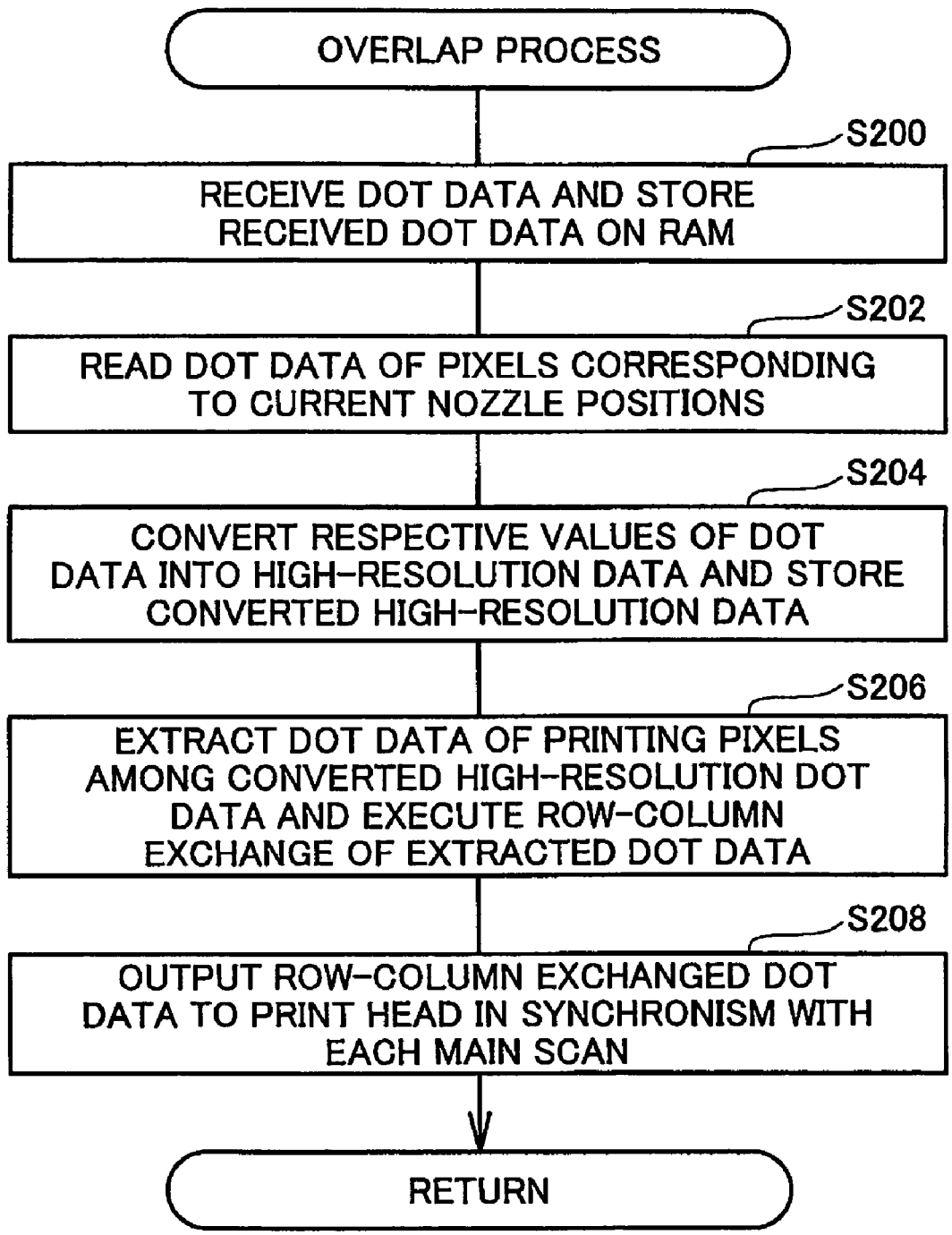
FIG. 12 is a flowchart showing an overlap process executed in a first embodiment.
Figure 13:
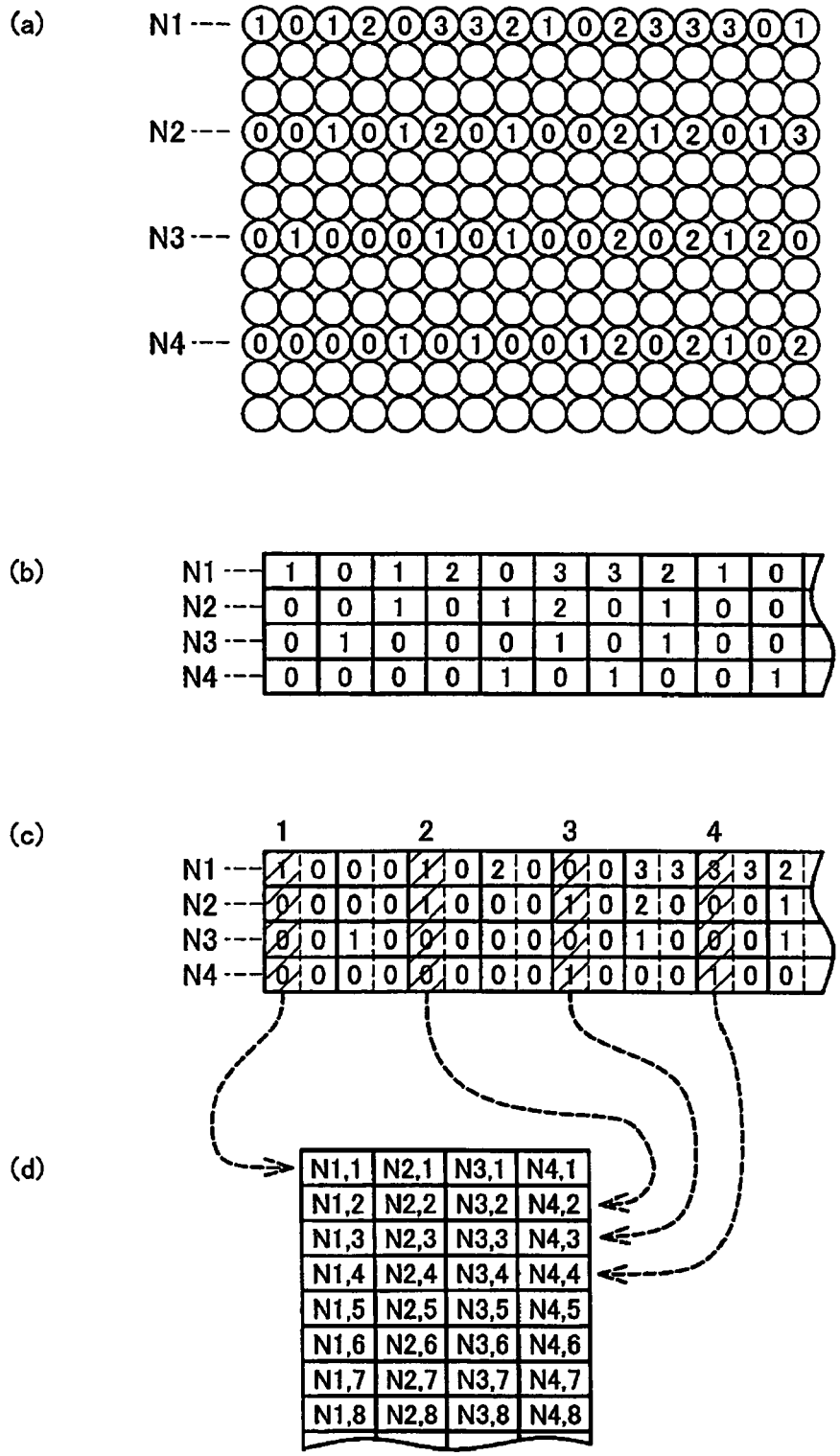
FIG. 13 conceptually shows the overlap process of the first embodiment executed by a control circuit of the printer.

FIG. 12 is a flowchart showing an overlap process executed in the first embodiment. The internal CPU of the control circuit 260 executes this overlap process, when the control circuit 260 in the printer 200 receives the dot data output from the computer 100. FIG. 13 conceptually shows the overlap process of the first embodiment executed by the control circuit 260. The description follows the flowchart of FIG. 12 with reference to FIG. 13.

When the overlap process of the first embodiment starts, the control circuit 260 first receives dot data and temporarily stores the received dot data in the internal RAM (step S200). As described later, the printer 200 of the embodiment prints a high-quality image of the enhanced resolution, while receiving the dot data of the lower resolution than the printing resolution from the computer 100. For convenience of explanation, it is here assumed that the received dot data has the resolution of 720 dpi both in the main scanning direction and in the sub-scanning direction (the resolution of 720 dpi×720 dpi) and that the printed image has the resolution of 1440 dpi in the main scanning direction and 720 dpi in the sub-scanning direction (the resolution of 1440 dpi×720 dpi). As described previously, the printer 200 of this embodiment is capable of creating the three variable size dots, that is, the large-size dot, the medium-size dot, and the small-size dot. The dot data received from the computer 100 accordingly represent the settings of the four available states, 'formation of the large-size dot', 'formation of the medium-size dot', 'formation of the small-size dot', and 'no dot formation'. Dot data '3', '2', '1', and '0' are respectively allocated to pixels having the selection of the state 'formation of the large-size dot', pixels having the selection of the state 'formation of the medium-size dot', pixels having the selection of the state 'formation of the small-size dot', and pixels having the selection of the state 'no dot formation'.

FIG. 13(a) conceptually shows storage of such dot data on the internal RAM of the control circuit 260. Each circle in FIG. 13(a) represents the position of a pixel included in an image, and one of the dot data '0' to '3' is allocated to each pixel position. The dot data are supplied from the computer 100 in the pixel sequence on the image. The control circuit 260 of the printer 200 temporarily stores the received dot data in the order of reception, that is, in the pixel sequence, on the RAM as shown in FIG. 13(a).

After temporary storage of the received dot data on the RAM, the control circuit 260 reads dot data of pixels corresponding to the current nozzle positions (step S202 in the flowchart of FIG. 12). As described previously with reference to FIG. 10, the print head has the nozzles Nx arranged at the intervals of the nozzle pitch k. Main scans and sub-scans are repeated to create dots in a preset order like a mosaic and print a resulting image. The processing of step S202 reads only the dot data of pixel arrays corresponding to the current nozzle positions in a main scan of the print head and rewrites the read-out dot data in the units of pixel arrays in a different area on the RAM.

For convenience of explanation, as in the illustrated example of FIGS. 10 and 11, it is assumed that the print head has the four nozzles N1 to N4 arranged at the intervals of the nozzle pitch 3. N1, N2, N3, and N4 in FIG. 13(a) show the current positions of these four nozzles. At step S202 in the flowchart of FIG. 12, only the dot data corresponding to these nozzle positions are read out and are written in the different area on the RAM. For the simplicity of illustration, the values of the dot data are shown only for the pixels corresponding to the current nozzle positions in FIG. 13(a).

FIG. 13(b) conceptually shows storage of the dot data in the different area on the RAM. As mentioned above, the dot data sent from the computer 100 have the resolution of 720 dpi both in the main scanning direction and in the sub-scanning direction. The data of FIG. 13(b) are the extracted dot data corresponding to the current nozzle positions and accordingly have the resolution of 720 dpi×720 dpi.

The control circuit 260 subsequently converts the extracted dot data corresponding to the current nozzle positions as shown in FIG. 13(b) into high-resolution data (step S204). Any arbitrary resolution may be set for this resolution enhancement as the occasion demands. For the better understanding, the description regards a simplest case, where the resolution in only the main scanning direction is doubled. Since the dot data of FIG. 13(b) have the resolution of 720 dpi×720 dpi, doubling the resolution in the main scanning direction gives the printed image having the resolution of 1440 dpi×720 dpi, that is, the resolution of 1440 dpi in the main scanning direction and 720 dpi in the sub-scanning direction.

The conversion technique adopted here converts the value of the dot data allocated to each pixel into preset values of high-resolution dot data. The dot data have the values of '0' to '3' as mentioned above. The respective values '0', '1', '2', and '3' of the dot data are mapped in advance to the values of high-resolution dot data. The conversion technique refers to the preset mapping and converts the dot data of each pixel into high-resolution dot data.

FIGS. 14A through 14F show examples of available mappings of high-resolution dot data to low-resolution dot data. This example doubles the resolution in only the main scanning direction. Each pixel is accordingly divided into two pixels aligned in the main scanning direction, and the dot data of one pixel is converted into dot data of the two divisional pixels. A mapping A shown in FIG. 14A maps dot data '0' of one pixel to dot data '0' of two pixels. Namely the pixel having the selected state of 'no dot formation' is divided into two pixels having the setting of 'no dot formation'. Dot data '1' of one pixel is mapped to dot data '1' and '0' of two pixels. Namely the pixel having the selected state of 'formation of the small-size dot' is divided into two pixels, a left divisional pixel having the setting of 'formation of the small-size dot' and a right divisional pixel having the setting of 'no dot formation'. Similarly dot data '2' of one pixel is mapped to dot data '2' and '0' of two pixels. Namely the pixel having the selected state of 'formation of the medium-size dot' is divided into two pixels, a left divisional pixel having the setting of 'formation of the medium-size dot' and a right divisional pixel having the setting of 'no dot formation'. Dot data '3' of one pixel is mapped to dot data '3' of two pixels. Namely the pixel having the selected state of 'formation of the large-size dot' is divided into two pixels having the setting of 'formation of the large-size dot'.

FIG. 13(c) shows high-resolution dot data converted from the low-resolution dot data of FIG. 13(b) according to the mapping A shown in FIG. 14A. The conversion of the low-resolution dot data into the high-resolution dot data is not restricted to the mapping A of FIG. 14A. The mapping A may be replaced by any of diverse mappings, for example, a mapping B shown in FIG. 14B, a mapping C shown in FIG. 14C, a mapping D shown in FIG. 14D, a mapping E shown in FIG. 14E, and a mapping F shown in FIG. 14F.

The processing of step S204 in the flowchart of FIG. 12 converts the low-resolution dot data (the resolution of 720 dpi×720 dpi in the example) of each pixel into the high-resolution dot data (the resolution of 1440 dpi×720 dpi in the example) and temporarily stores the converted high-resolution dot data on the internal RAM of the control circuit 260.

After conversion of the low-resolution dot data into the high-resolution dot data, the control circuit 260 of the printer 200 extracts dot data corresponding to only current object pixels of dot formation by the print head (printing pixels) among the converted high-resolution dot data and exchanges the row and the column of the extracted dot data (step S206). The details of the row-column extraction are described with reference to the example of FIG. 13. As shown in FIG. 13(c), the converted high-resolution dot data are aligned in the pixel sequence in the main scanning direction (in the direction of the rows). The print head, however, actually creates dots in pixels of the preset intervals to complete a printed image. The order of dot formation is thus different from the pixel sequence on the image. It is here assumed that hatched pixels in FIG. 13(c) are the object pixels of dot formation. The procedure extracts the dot data corresponding to only these hatched pixels, exchanges the row and the column of the extracted dot data, and writes the row-column exchanged dot data on the RAM. For example, dot data in a left most hatched column in FIG. 13(c) go through the row-column exchange and are written as dot data of a first row on the RAM. Dot data in a second left hatched column in FIG. 13(c) also go through the row-column exchange and are written as dot data of a second row on the RAM.

FIG. 13(d) conceptually shows the result of the row-column exchange of the high-resolution dot data shown in FIG. 13(c). As illustrated, the row-column exchange sets the dot data of the pixels with dots to be created first by the respective nozzles N1 to N4 in the first row. In a similar manner, the dot data of the pixels with dots to be created second by the respective nozzles and the dot data of the pixels with dots to be created third by the respective nozzles are set in the second row and in the third row, respectively.

The control circuit 260 converts the high-resolution dot data into the row-column exchanged data shown in FIG. 13(d) and sequentially reads and supplies the row-column exchanged data from the first row to the print head in synchronism with each main scan of the carriage 240 (step S208 in FIG. 12). Ink droplets are accordingly ejected from the print head to create dots at adequate positions on the printing paper.

On completion of the above series of processing with regard to all the pixels, the program exits from the overlap process of the first embodiment shown in FIG. 12 and goes back to the image printing process of FIG. 6 to conclude printing of a resulting image.

As described above, the overlap process of the first embodiment receives the low-resolution dot data (the data having the resolution of 720 dpi×720 dpi in the illustrated example), converts the received low-resolution do data into the high-resolution dot data (the data having the resolution of 1440 dpi×720 dpi in the example), and creates dots according to the converted high-resolution dot data, so as to print a high-quality image.

As described above with reference to FIGS. 12 and 13, the overlap process of the first embodiment converts only the dot data regarding the pixels corresponding to the current nozzle positions into high-resolution dot data. Namely only the dot data of FIG. 13(b) corresponding to the current nozzle positions are extracted from the dot data of FIG. 13(a) supplied from the computer 100 and are converted into the high-resolution data. This means that most of the supplied dot data are stored in the low resolution on the RAM. This arrangement significantly saves the required storage capacity, compared with storage of the dot data received from the computer 100 in the high resolution on the RAM.

The effect of significantly saving the required storage capacity by the specific overlap process of the embodiment is described supplementarily. The higher-resolution printing than the resolution of dot data received from the computer generally requires conversion of the low-resolution dot data stored on the RAM into the high-resolution dot data. In the illustrated example of FIGS. 12 and 13, conversion of the lower-resolution dot data of 720 dpi×720 dpi into the higher-resolution dot data of 1440 dpi×720 dpi is required.

FIG. 15 conceptually shows an increase in storage capacity required for storage of high-resolution dot data converted from low-resolution dot data. FIG. 15(a) conceptually shows storage of dot data, which is supplied from the computer and has the resolution of 720 dpi×720 dpi, on the RAM. Conversion of this dot data into the higher-resolution dot data of 1440 dpi×720 dpi doubles the required storage capacity as shown in FIG. 15(b). The higher-resolution printing than the resolution of dot data received from the computer significantly increases the storage capacity required for storage of the converted high-resolution data.

Figure 16:
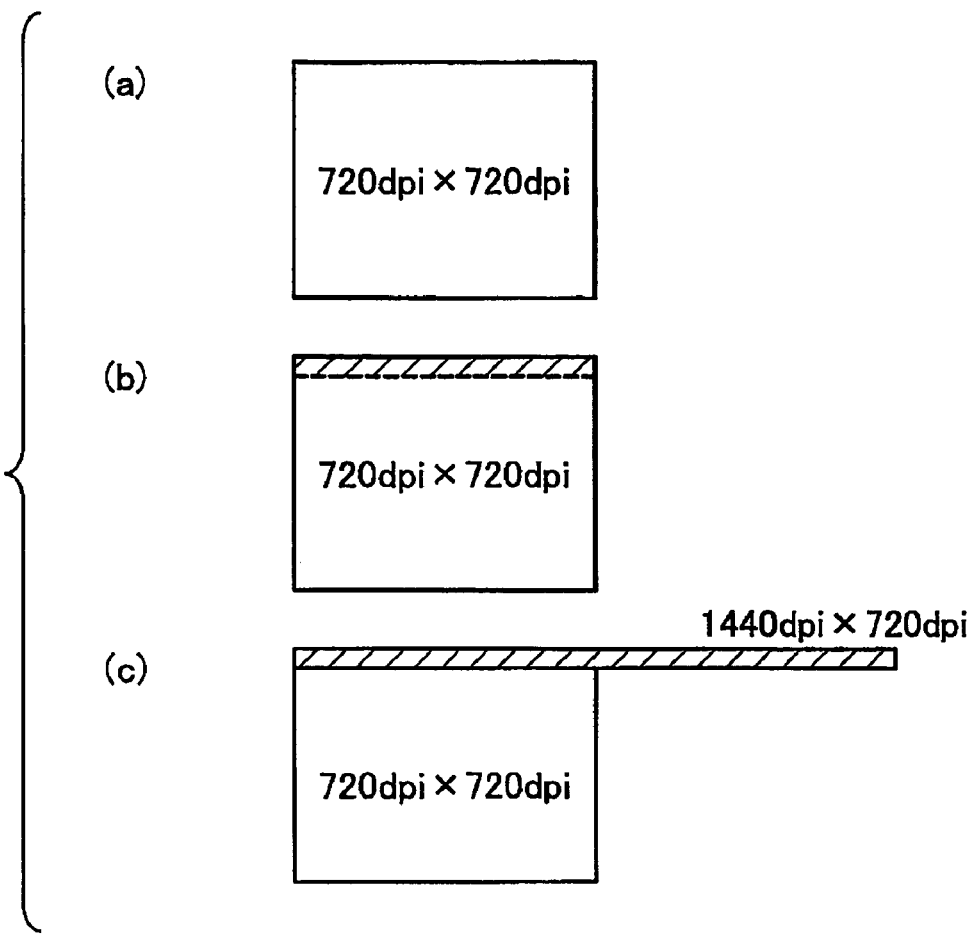
FIG. 16 conceptually shows an increase in storage capacity required for storage of high-resolution dot data converted from low-resolution dot data in the overlap process of the first embodiment.

FIG. 16 conceptually shows an increase in storage capacity required for storage of high-resolution dot data converted from low-resolution dot data in the overlap process of the first embodiment. FIG. 16(a) conceptually shows storage of dot data having the resolution of 720 dpi×720 dpi on the RAM. The overlap process of this embodiment converts only the dot data corresponding to the current nozzle positions into the high-resolution data as described above. FIG. 16(b) conceptually shows extraction of the dot data corresponding to the current nozzle positions from the dot data stored on the RAM. The hatched portion represents the extracted dot data corresponding to the current nozzle positions. As clearly understood from the illustration, the dot data corresponding to the current nozzle positions occupies only a little fraction of the dot data stored on the RAM. The overlap process of this embodiment converts such a little portion of the dot data into the high-resolution data. FIG. 16(c) conceptually shows storage of the converted high-resolution dot data on the RAM for printing in the resolution of 1440 dpi×720 dpi. The resolution enhancement of the dot data corresponding to the current nozzle positions (the hatched portion in the illustration) certainly increases the required storage capacity. The target data of the resolution enhancement is, however, only a little portion of the dot data, and most of the dot data are continuously stored in the low resolution. The higher-resolution printing thus does not significantly increase the required storage capacity. Comparison between FIG. 15(b) and FIG. 16(c) clearly shows that the overlap process of this embodiment significantly saves the required storage capacity.

In the above description, only the dot data corresponding to the current nozzle positions are extracted and are converted into high-resolution dot data. The dot data extracted for the resolution enhancement are, however, not restricted to the dot data corresponding to the current nozzle positions but may be any part of the dot data supplied from the computer 100. The hatched dot data in FIGS. 16(b) and 16(c) may include other dot data, in addition to the dot data corresponding to the current nozzle positions. Addition of the supplementary dot data to those corresponding to the current nozzle positions naturally increases the required storage capacity. This, however, still effectively saves the required storage capacity, compared with the resolution enhancement of all the dot data supplied from the computer 100.

The overlap process of the first embodiment requires the computer 100 to generate only the low-resolution dot data, instead of the high-resolution dot data, for printing of a high-quality image. The computer 100 can thus promptly generate the dot data and supply the generated dot data to the printer 200. This arrangement thus ensures high-speed printing of a high-quality image.

The overlap process of the first embodiment converts the low-resolution dot data received from the computer 100 into the high-resolution dot data according to any of the available mappings shown in FIGS. 14A through 14F. For example, the small-size dots to be created in the pixels having the resolution of 720 dpi×720 dpi are converted into small-size dots to be created in the pixels having the resolution of 1440 dpi×720 dpi. The small-size dots in the resolution of 1440 dpi×720 dpi are smaller in size in proportion to the smaller pixels and are thus more inconspicuous than the small-size dots in the resolution of 720 dpi×720 dpi. The medium-size dots in the resolution of 720 dpi×720 dpi are similarly converted into the more inconspicuous medium-size dots in the resolution of 1440 dpi×720 dpi. This resolution enhancement causes image areas of high lightness to be filled with the more inconspicuous small-size dots and medium-size dots and thus remarkably improves the picture quality of a resulting image.

One large-size dot in the resolution of 720 dpi×720 dpi is converted into two large-size dots in the resolution of 1440 dpi×720 dpi. Namely formation of a large-size dot in one pixel in the resolution of 720 dpi×720 dpi is converted to formation of large-size dots in both of two divisional pixels in the resolution of 1440 dpi×720 dpi. Similarly non-dot formation in one pixel in the resolution of 720 dpi×720 dpi is converted to non-dot formation in both of two divisional pixels in the resolution of 1440 dpi×720 dpi. Such conversion causes dots to be created in all the pixels of the higher resolution in an image area where dots are created in all the pixels of the lower resolution. Similarly the conversion causes no dots to be created in any pixels of the higher resolution in an image area where no dots are created in any pixels of the lower resolution. This arrangement ensures adequate dot formation on the printing paper and thereby gives a high-quality printed image.

The overlap process of the first embodiment converts the lower-resolution small-size dot and medium-size dot into the higher-resolution small-size dot and medium-size dot that are smaller in size. The printer 200 takes charge of such conversion, while the computer 100 generates the low-resolution dot data in expectation of the subsequent conversion. This ensures dot formation at adequate densities and thereby gives a high-quality printed image. This characteristic is described below in a supplementary manner.

As described previously, the printer 200 is capable of creating the three variable size dots, that is, the large-size dot, the medium-size dot, and the small-size dot. The computer 100 determines the dot on-off state in each pixel with regard to the three variable size dots, the large-size dot, the medium-size dot, and the small-size dot to generate dot data. Any of diverse known techniques may be applicable to generate dot data. One available technique first converts color-converted image data of each color into tone data for the large-size dot, tone data for the medium-size dot, and tone data for the small-size dot and determines the dot on-off state in each pixel based on the converted tone data to generate dot data.

Figure 17A:
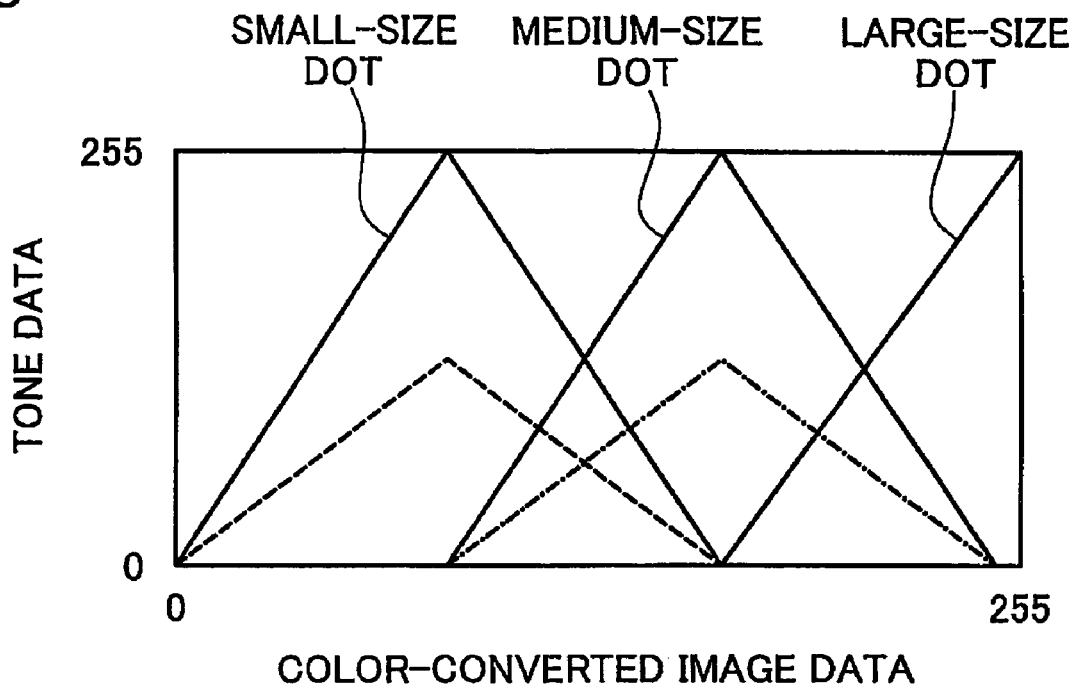
FIGS. 17A and 17B show conversion of color-converted image data of each color into tone data of variable size dots, the large-size dot, the medium-size dot, and the small-size dot.
Figure 17B:
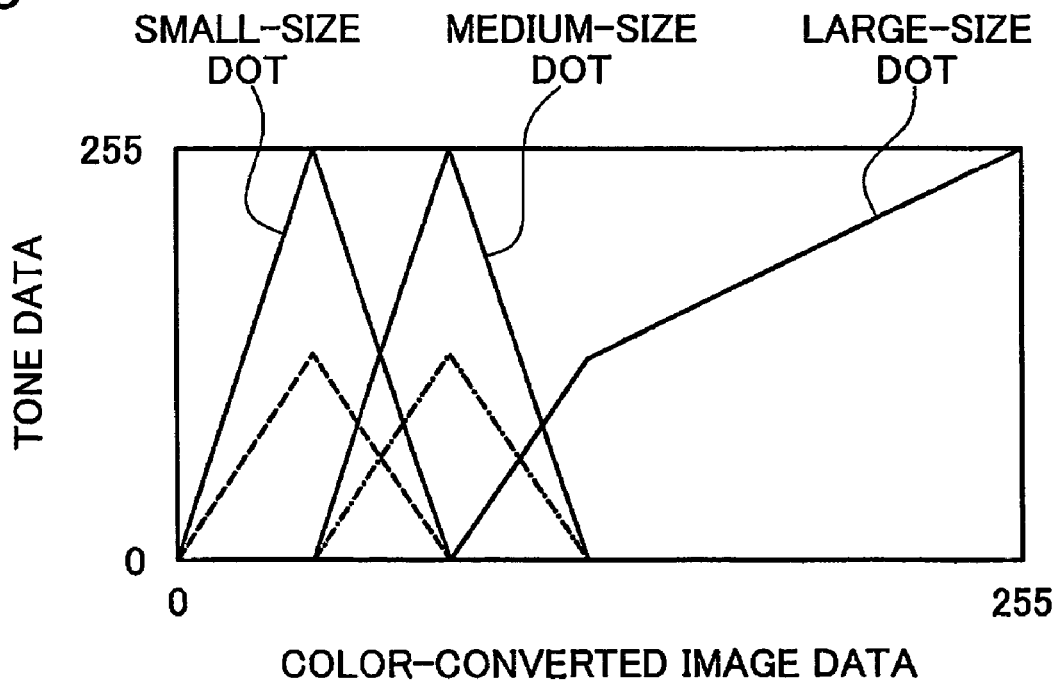

FIG. 17 shows conversion of color-converted image data of each color into tone data of the variable size dots, the large-size dot, the medium-size dot, and the small-size dot. FIG. 17A shows a standard process of generating dot data. FIG. 17B shows a process of generating dot data in expectation of the subsequent resolution enhancement by the overlap process of this embodiment. The standard process of generating dot data is described first with reference to FIG. 17A.

The standard dot generation procedure gradually increases the tone data for the small-size dot, the tone data for the medium-size dot, and the tone data for the large-size dot in this order with an increase in color-converted image data as shown in FIG. 17A. In an image area of the small color-converted image data, the procedure increases the tone data for the small-size dot with an increase in tone value of the image data. The procedure gradually decreases the tone data for the small-size dot after the increase to the maximum tone value of 255, while gradually increasing the tone data for the medium-size dot. Namely the tone data for the small-size dot is gradually replaced by the tone data for the medium-size dot with an increase in color-converted image data. After the increase in tone data for the medium-size dot to the maximum tone value of 255, the tone data for the medium-size dot is gradually replaced by the tone data for the large-size dot. In this manner, the standard process converts the color-converted image data into the tone data for the small-size dot, the tone data for the medium-size dot, and the tone data for the large-size dot and determines the dot on-off state in each pixel with regard to these three variable size dots based on the tone data, so as to generate adequate dot data.

The overlap process of this embodiment, on the other hand, creates the small-size dot and the medium-size dot only in half of the divisional pixels in the higher resolution, even when the small-size dot and the medium-size dot are created in all pixels in the lower resolution. This means the tone data for the small-size dot and the tone data for the medium-size dot halve the respective tone values. Conversion of the color-converted image data into the tone data for the small-size dot shown by the solid line in FIG. 17A actually gives formation of the small-size dot at a density equivalent to conversion into tone data shown by the broken line. Similarly conversion of the color-converted image data into the tone data for the medium-size dot shown by the slid line in FIG. 17A actually gives formation of the medium-size dot at a density equivalent to conversion into tone data shown by the one-dot chain line.

Such resolution enhancement shrinks the tone data for the small-size dot and the tone data for the medium-size dot. The procedure of this embodiment thus gives greater settings to the tone data for the small-size dot and the tone data for the medium-size dot by taking into account such potential shrinkage. As shown in FIG. 17B, the procedure abruptly increases the tone data for the small-size dot with an increase in color-converted image data to compensate for the potential shrinkage accompanied by the resolution enhancement. After the increase in tone data for the small-size dot to the maximum tone value of 255, the tone data for the small-size dot is replaced by the tone data for the medium-size dot. At this stage, replacement of the tone data for the small-size dot by the tone data for the medium-size dot is carried out in a relatively abrupt manner, in order to compensate for the potential shrinkage accompanied by the resolution enhancement. The procedure converts the color-converted image data into the tone data of the respective size dots in this manner by taking into account the potential effects of the resolution enhancement, generates dot data from the tone data, and supplies the generated dot data to the printer 200. The control circuit 260 of the printer 200 converts the received dot data into high-resolution data and adequately creates the respective size dots to give a high-quality printed image.

D-3. Modified Example of First Embodiment

The overlap process of the first embodiment described above enhances the resolution in the main scanning direction for conversion of the low-resolution dot data into the high-resolution dot data. The direction of the resolution enhancement is, however, not restricted to the main scanning direction but may be the sub-scanning direction. Such resolution enhancement is described briefly below as a modified overlap process in one modified example of the first embodiment.

Figure 18:
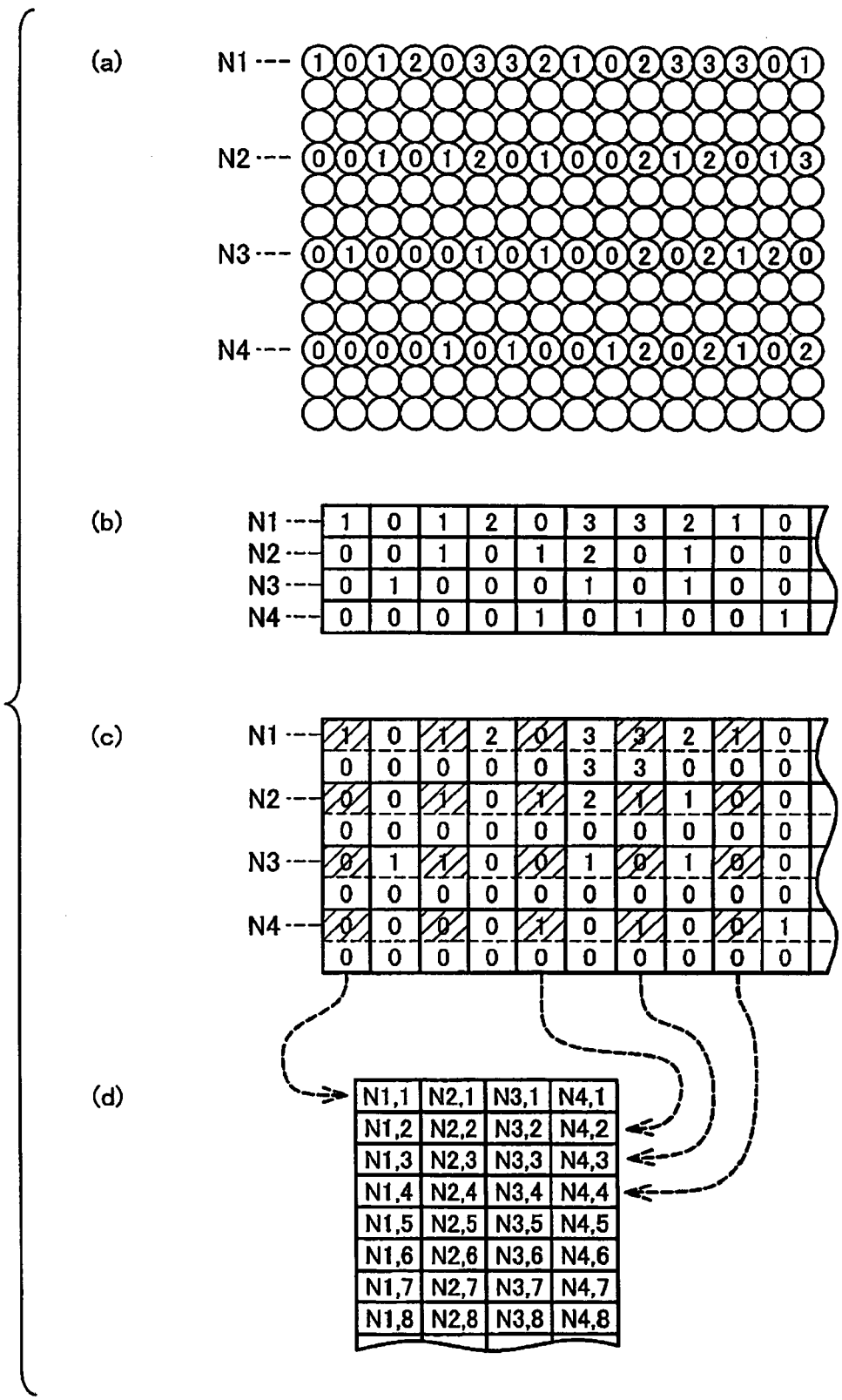
FIG. 18 conceptually shows a modified overlap process in one modified example of the first embodiment executed by the control circuit of the printer.

FIG. 18 conceptually shows the modified overlap process in the modified example of the first embodiment executed by the control circuit 260 of the printer 200. FIG. 18(a) conceptually shows storage of low-resolution dot data (720 dpi×720 dpi), which is received from the computer 100, on the RAM. The modified overlap process enhances the resolution of the dot data stored on the RAM in the sub-scanning direction to print a higher-resolution image of 720 dpi×1440 dpi. The modified overlap process first extracts dot data corresponding to the current nozzle positions and writes the extracted dot data into a different area on the RAM. FIG. 18(b) conceptually shows storage of the extracted dot data.

The extracted dot data have the resolution of 720 dpi×720 dpi. The modified overlap process then doubles the resolution in the sub-scanning direction to convert the extracted dot data into higher-resolution dot data of 720 dpi×1440 dpi. FIG. 18(c) conceptually shows storage of the converted high-resolution dot data on the RAM. The procedure of the resolution enhancement in the sub-scanning direction sets in advance a mapping of high-resolution dot data to low-resolution dot data and converts the received low-resolution dot data into high-resolution dot data according to the preset mapping. FIGS. 19A to 19C give examples of available mappings.

The modified overlap process subsequently extracts dot data of printing pixels, where dots are to be created currently by the respective nozzles N1 to N4, among the stored high-resolution dot data, executes row-column exchange of the extracted dot data, and writes the row-column exchanged dot data on the RAM. The data of the printing pixels are shown as hatched rectangles in FIG. 18(c). FIG. 18(d) conceptually shows the process of extracting dot data of printing pixels from the high-resolution dot data, exchanging the row and the column of the extracted data, and writing the row-column exchanged dot data on the RAM. The row-column exchanged dot data are supplied to the print head in synchronism with each main scan of the carriage 240 to print a high-resolution image on the printing paper.

The dot data of pixels other than the printing pixels in FIG. 18(*c*) may be kept storage for a subsequent demand or may be discarded once and be regenerated from the low-resolution data as the occasion demands. Storage of the dot data of pixels other than the printing pixels naturally increases the required storage capacity of the RAM. This, however, still effectively saves the storage capacity, compared with the resolution enhancement for all the dot data. Destruction of the dot data of pixels other than the printing pixels, on the other hand, significantly saves the storage capacity of the RAM, although requiring regeneration of the high-resolution dot data from the low-resolution dot data.

E. Second Embodiment

The overlap process of the first embodiment described above adopts one of the preset mappings (shown in FIGS. 14A to 14F) to convert the low-resolution dot data into the high-resolution dot data. It is allowed to set multiple mappings for such resolution enhancement as mentioned above. One applicable procedure may thus adequately switch over the multiple mappings to convert the low-resolution dot data into the high-resolution dot data. This is described below as an overlap process of a second embodiment.

Figure 20:
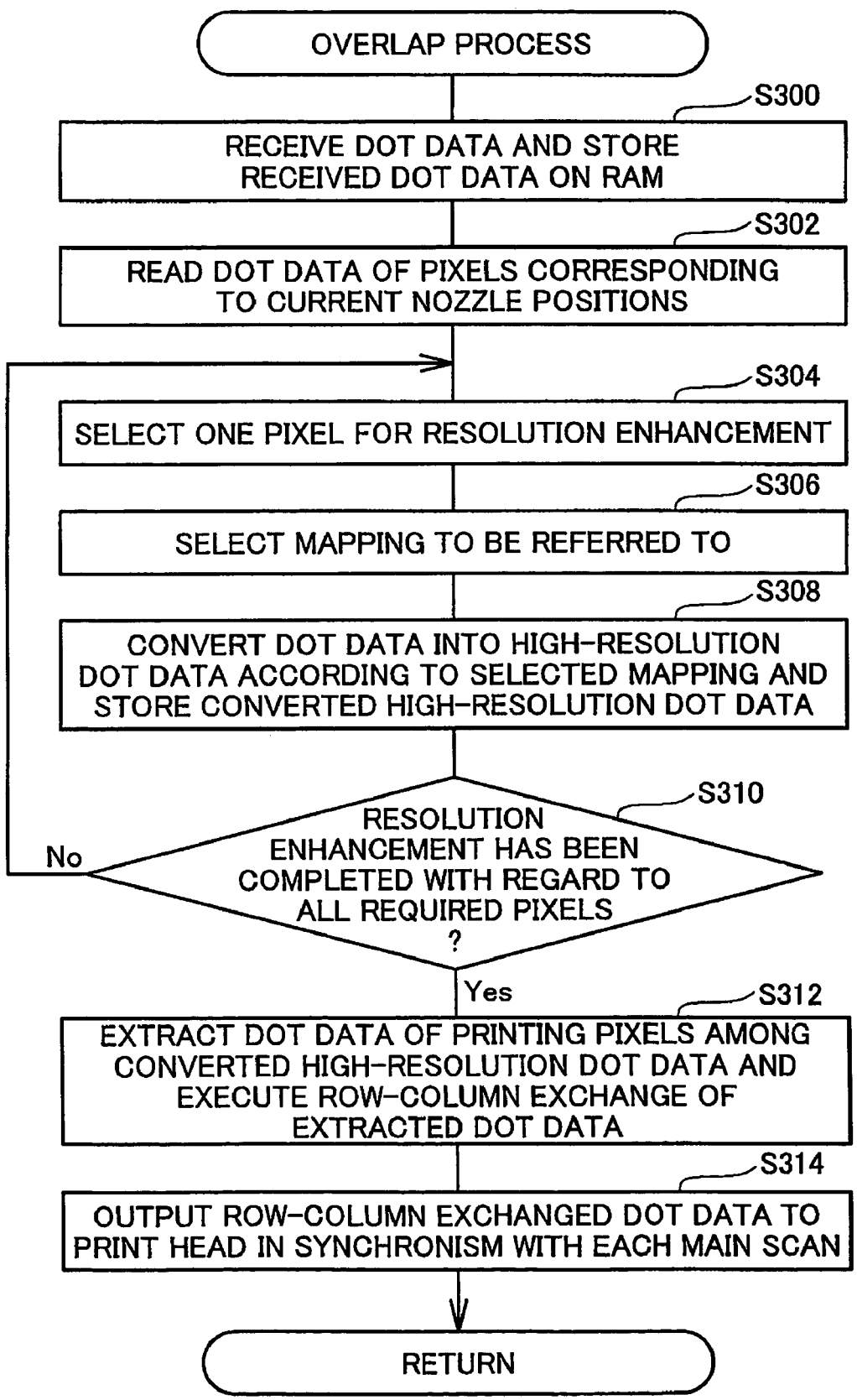
FIG. 20 is a flowchart showing an overlap process executed in a second embodiment.

FIG. 20 is a flowchart showing the overlap process executed in the second embodiment. The primary difference from the overlap process of the first embodiment is selective application of multiple mappings to conversion of the low-resolution dot data into the high-resolution dot data. Otherwise the overlap process of the second embodiment is similar to the overlap process of the first embodiment. The following description thus mainly regards the differences between the overlap process of the second embodiment and the overlap process of the first embodiment.

The overlap process of the second embodiment first receives dot data from the computer 100 and temporarily stores the received dot data in the internal RAM of the control circuit 260 (step S300). Like the first embodiment discussed above, the dot data received from the computer 100 are the low-resolution data. The dot data include settings of the values '3', '2', '1', and '0' allocated to the respective pixels, where the values '3', '2', '1', and '0' respectively represent 'formation of the large-size dot', 'formation of the medium-size dot', 'formation of the small-size dot', and 'no dot formation'. The dot data are stored on the RAM of the control circuit 260 in the pixel sequence on the image as shown in FIG. 13(*a*).

The overlap process then reads dot data of pixels corresponding to the current nozzle positions among the dot data stored on the RAM and writes the read-out dot data in the units of pixel arrays in a different area on the RAM (step S302). Namely the dot data of the pixel arrays corresponding to the current positions of the respective nozzles N1 to N4 are read from the dot data stored as shown in FIG. 13(*a*) and are written in the different area on the RAM as shown in FIG. 13(*b*).

After reading out the dot data of the pixels corresponding to the current nozzle positions, the overlap process of the second embodiment selects one target pixel for resolution enhancement among these corresponding pixels (step S304) and selects one mapping of high-resolution dot data to low-resolution dot data to be referred to for the selected pixel (step S306). Multiple available mappings of high-resolution dot data to low-resolution dot data as shown in FIGS. 14A to 14F are stored in advance. The overlap process of the second embodiment selects one mapping among the stored multiple available mappings.

One mapping may be selected for the selected pixel at random among the multiple available mappings. The overlap process of the second embodiment, however, refers to a matrix that sets the mappings to be selected for the respective pixels. A matrix setting the mappings to be selected for the respective pixels is provided in advance as shown in FIG. 21. The overlap process refers to this matrix and selects the mapping set for each selected pixel for the resolution enhancement of the dot data.

The optimum distribution of the mappings to be selected in the matrix gives a high-quality printed image. The method of adequately distributing the multiple mappings will be described later.

After selection of one target pixel for the resolution enhancement and one mapping to be referred to for the selected target pixel (steps S304 and S306), the overlap process of the second embodiment converts the low-resolution dot data into the high-resolution dot data with regard to the selected pixel according to the selected mapping and temporarily stores the high-resolution dot data into the RAM (step S308), like the overlap process of the first embodiment.

After conversion of the dot data of one selected pixel into the high-resolution dot data, it is determined whether the dot data of all the pixels corresponding to the current nozzle positions have been converted into high-resolution dot data (step S310). When there is any unprocessed pixel for resolution enhancement (step S310: No), the overlap process goes back to step S304 to select a next target pixel for the resolution enhancement and executes the subsequent series of processing. When the dot data of all the pixels corresponding to the current nozzle positions have been converted into high-resolution dot data (step S310: Yes) through the repeated series of processing, the storage of the high-resolution dot data on the RAM is given as shown in FIG. 13(*c*).

On completion of the conversion of the low-resolution dot data into the high-resolution dot data, the overlap process extracts dot data of printing pixels, where dots are actually to be created by the print head, exchanges the row and the column of the extracted dot data, and writes the row-column extracted dot data into the RAM (step S312). This series of operations is identical with the processing of step S206 in the overlap process of the first embodiment shown in the flowchart of FIG. 12 and is thus not described in detail here.

Eventually obtained are dot data rearranged in the order of actual dot formation by the print head. As shown in FIG. 13(*d*), the dot data of the pixels with dots to be created first by the respective nozzles N1 to N4 are set in the first row. In a similar manner, the dot data of the pixels with dots to be created second by the respective nozzles and the dot data of the pixels with dots to be created third by the respective nozzles are set in the second row and in the third row, respectively.

The control circuit 260 sequentially reads and supplies the rearranged dot data from the first row to the print head in synchronism with each main scan of the carriage 240 (step S314). Ink droplets are accordingly ejected from the print head to create dots at adequate positions on the printing paper.

On completion of the above series of processing with regard to all the pixels, the program exits from the overlap process of the second embodiment shown in FIG. 20 and goes back to the image printing process of FIG. 6 to conclude printing of a resulting image.

As described above, the overlap process of the second embodiment selectively adopts one of the multiple mappings to convert the low-resolution dot data into the high-resolution dot data. This arrangement effectively prevents formation of dots in a fixed pattern and accordingly gives a high-quality printed image.

The optimum distribution of the multiple mappings to be selected for the resolution enhancement of the respective pixels desirably assures the better dispersion of dots and thereby improves the picture quality of the resulting printed image. The overlap process of the second embodiment uses the matrix shown in FIG. 21 to switch over the selection of the mapping. This matrix is prepared for the optimum selection among the multiple available mappings.

The matrix of FIG. 21 sets the mappings to be selected for the respective pixels. The distribution of the selected mappings is determined according to a dither matrix. The dither matrix has settings of multiple threshold values corresponding to the respective pixels as shown in FIG. 8. The distribution of the threshold values is optimized for the better dispersion of dots. Preparation of the matrix of the mappings based on the dither matrix accordingly attains the better dispersion of dots. The matrix of the mappings shown in FIG. 21 is prepared according to the dither matrix of FIG. 8 as described below.

The matrix of FIG. 21 shows selection of two mappings A and B, whereas the dither matrix of FIG. 8 sets the threshold values in the tone range of 0 to 255. The procedure sets a middle value 128 in the tone range of 0 to 255 to a threshold value and divides the multiple pixels of the dither matrix into a pixel group of smaller than the threshold value and a pixel grope of greater than the threshold value. The mapping A is selected for one pixel group, while the mapping B is selected for the other pixel group. The matrix of FIG. 21 is given by selecting the mapping A for the pixel group of smaller than the threshold value and the mapping B for the pixel group of greater than the threshold value.

When selection of three mappings is set in a matrix, instead of selection of the two mappings as in FIG. 21, the procedure sets two threshold values 85 and 170 for division of the tone value range of 0 to 255 into three roughly equal parts and selects one among the three mappings corresponding to the comparison with these threshold values.

The switchover of the selection among the multiple available mappings according to the matrix effectively prevents formation of dots in a periodical fixed pattern and thereby gives a high-quality image of good dot dispersion.

The dither matrix used for the selection of the mappings is preferably optimized for the good dot dispersion with regard to the lower-resolution image data. The overlap process of the second embodiment converts the lower-resolution dot data of 720 dpi×720 dpi into the higher-resolution dot data of 1440 dpi×720 dpi. It is accordingly desirable to select the mapping according to the dither matrix optimized for the image data having the resolution of 720 dpi×720 dpi. The higher-resolution dot data of multiple pixels are mapped to the lower-resolution dot data of one pixel. The dither matrix optimized for the lower-resolution image data is thus effectively used for adequate selection of the mapping for each pixel in the low resolution.

The embodiments and their modified examples discussed above are to be considered in all aspects as illustrative and not restrictive. There may be many other modifications, changes, and alterations without departing from the scope or spirit of the main characteristics of the present invention. For example, the software programs (application programs) of actualizing the functions of the invention may be supplied to a main memory or an external storage device of a computer system via a communication line to be executed. The software programs may be read from a portable medium, such as a CD-ROM or a flexible disk, to be executed.

The above embodiments regard the printers that create dots on the printing paper to print an image. The technique of the invention is, however, not restricted to these printers but may also be applicable to other devices, for example, liquid crystal display devices that disperse luminescent spots at adequate densities on a liquid crystal display screen to express an image of continuously varying tones.

What is claimed is:

1. An image output device that creates dots on an output medium to complete a resulting output image, said image output device comprising:
    a dot data storage module that stores dot data representing a dot on-off state with regard to each of multiple pixels included in the image;
    multiple dot formation elements that are actuated to create dots simultaneously on multiple pixel arrays arranged at preset intervals; and
    a dot data supply module that reads dot data of the multiple pixel arrays, on which dots are to be created simultaneously by the multiple dot formation elements, out of said dot data storage module, converts the read-out dot data into high-resolution dot data, and supplies the high-resolution dot data in an order of actual dot formation to the multiple dot formation elements,
    wherein each of the multiple dot formation elements is capable of creating different types of dots having variable sizes,
    said dot data storage module stores a selected type of dot to be created in each pixel as the dot data, and
    said dot data supply module converts dot data of each pixel into data of plural divisional pixels where the selected type of dot is to be created in a preset distribution, and supplies the data of the plural divisional pixels to the multiple dot formation elements.

2. An image output device in accordance with claim 1, wherein the multiple dot formation elements simultaneously create dots in a preset number of pixels selected among plural pixels included in each of the multiple pixel arrays, so as to complete each pixel away by multiple operations of dot formation.

3. An image output device in accordance with claim 1, wherein said dot data supply module enhances resolution of the read-out dot data in a direction of the pixel arrays to the high-resolution dot data and subsequently supplies the high-resolution dot data to the multiple dot formation elements.

4. An image output device in accordance with claim 1, wherein said dot data supply module enhances resolution of the read-out dot data in a direction perpendicular to the pixel arrays to the high-resolution dot data and subsequently supplies the high-resolution dot data to the multiple dot formation elements.

5. An image output device in accordance with claim 1, wherein said dot data supply module converts dot data of each pixel with a largest-size dot to be created into the data of the plural divisional pixels where the largest-size dot is to be created in all the plural divisional pixels, and supplies the data of the plural divisional pixels to the multiple dot formation elements.

6. An image output device in accordance with claim 1, wherein said dot data supply module stores multiple mappings of each dot type to a distribution of dots to be created in the plural divisional pixels, selectively applies one of the stored multiple mappings to convert the dot data into the high-resolution dot data, and supplies the converted high-resolution dot data to the multiple dot formation elements.

7. An image output device in accordance with claim 1, wherein said dot data supply module selects one of the multiple mappings according to a dither matrix, which is set for an original resolution prior to resolution enhancement, to convert the dot data into the high-resolution dot data, and supplies the converted high-resolution dot data to the multiple dot formation elements.

* * * * *